United States Patent
Robinson et al.

(10) Patent No.: US 10,393,946 B2
(45) Date of Patent: Aug. 27, 2019

(54) METHOD OF MANUFACTURING DIRECTIONAL BACKLIGHT APPARATUS AND DIRECTIONAL STRUCTURED OPTICAL FILM

(71) Applicant: RealD Spark, LLC, Beverly Hills, CA (US)

(72) Inventors: Michael G. Robinson, Boulder, CO (US); Graham J. Woodgate, Henley on Thames (GB); Jonathan Harrold, Leamington Spa (GB); Gary D. Sharp, Boulder, CO (US); Miller H. Schuck, Erie, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 15/273,074

(22) Filed: Sep. 22, 2016

(65) Prior Publication Data

US 2017/0075057 A1    Mar. 16, 2017

Related U.S. Application Data

(63) Continuation of application No. 13/897,163, filed on May 17, 2013, now abandoned.
(Continued)

(51) Int. Cl.
*F21V 7/04* (2006.01)
*F21V 8/00* (2006.01)
*G02B 27/22* (2018.01)

(52) U.S. Cl.
CPC ......... *G02B 6/0048* (2013.01); *G02B 6/0025* (2013.01); *G02B 6/0026* (2013.01);
(Continued)

(58) Field of Classification Search
CPC .. G02B 6/0025; G02B 6/0028; G02B 6/0031; G02B 6/0033; G02B 6/0043;
(Continued)

(56) References Cited

U.S. PATENT DOCUMENTS 2,133,121 A    10/1938   Stearns
2,810,905 A    10/1957   Barlow
(Continued)

FOREIGN PATENT DOCUMENTS

EP    0939273        1/1999
EP    0860729 B1    7/2006
(Continued)

OTHER PUBLICATIONS

International search report and written opinion of international searching authority for PCT application PCT/US2013/063133 dated Jan. 20, 2014.
(Continued)

*Primary Examiner* — Audrey Y Chang
(74) *Attorney, Agent, or Firm* — Penny L. Lowry; Neil G. J. Mothew

(57) ABSTRACT

Disclosed is a manufacturing method for a stepped imaging directional backlight apparatus which may include a structured optical film and a tapered body. The structured optical film may include multiple optical functions and may be assembled by folding onto the tapered body, reducing cost and complexity of manufacture.

16 Claims, 33 Drawing Sheets

Related U.S. Application Data

(60) Provisional application No. 61/649,133, filed on May 18, 2012.

(52) U.S. Cl.
CPC ......... *G02B 6/0053* (2013.01); *G02B 6/0055* (2013.01); *G02B 6/0061* (2013.01); *G02B 6/0065* (2013.01); *G02B 6/0068* (2013.01); *G02B 27/225* (2013.01); *G02B 27/2214* (2013.01); *Y10T 29/49002* (2015.01)

(58) Field of Classification Search
CPC .. G02B 6/0046; G02B 6/0048; G02B 6/0051; G02B 6/0055; G02B 6/0056
USPC ....................... 385/129, 146, 37; 362/23.09
See application file for complete search history.

(56) References Cited

U.S. PATENT DOCUMENTS

| | | | |
|---|---|---|---|
| 5,347,644 A | 9/1994 | Sedlmayr | |
| 5,528,720 A * | 6/1996 | Winston | F21V 5/02 385/129 |
| 5,703,667 A | 12/1997 | Ochiai | |
| 5,727,107 A | 3/1998 | Umemoto et al. | |
| 5,771,066 A | 6/1998 | Barnea | |
| 5,896,225 A | 4/1999 | Chikazawa | |
| 5,903,388 A | 5/1999 | Sedlmayr | |
| 5,959,664 A | 9/1999 | Woodgate | |
| 5,971,559 A | 10/1999 | Ishikawa et al. | |
| 6,014,164 A | 1/2000 | Woodgate et al. | |
| 6,061,489 A | 5/2000 | Ezra et al. | |
| 6,075,557 A | 6/2000 | Holliman et al. | |
| 6,108,059 A | 8/2000 | Yang | |
| 6,144,118 A | 11/2000 | Cahill et al. | |
| 6,199,995 B1 | 3/2001 | Umemoto | |
| 6,305,813 B1 | 10/2001 | Lekson et al. | |
| 6,464,365 B1 | 10/2002 | Gunn et al. | |
| 6,663,254 B2 | 12/2003 | Ohsumi | |
| 6,847,488 B2 | 1/2005 | Travis | |
| 6,870,671 B2 | 3/2005 | Travis | |
| 6,883,919 B2 | 4/2005 | Travis | |
| 7,052,168 B2 | 5/2006 | Epstein et al. | |
| 7,058,252 B2 | 6/2006 | Woodgate | |
| 7,073,933 B2 * | 7/2006 | Gotoh | G02B 6/0016 362/23.09 |
| 7,101,048 B2 | 9/2006 | Travis | |
| 7,136,031 B2 | 11/2006 | Lee et al. | |
| 7,215,415 B2 | 5/2007 | Maehara | |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,750,981 B2 | 7/2010 | Shestak | |
| 7,750,982 B2 | 7/2010 | Nelson | |
| 7,660,047 B1 | 8/2010 | Travis et al. | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,216,405 B2 | 7/2012 | Emerton | |
| 8,223,296 B2 | 7/2012 | Lee et al. | |
| 8,325,295 B2 | 12/2012 | Sugita | |
| 8,354,806 B2 | 1/2013 | Travis | |
| 8,477,261 B2 * | 7/2013 | Travis | G02B 6/0056 349/117 |
| 8,534,901 B2 | 9/2013 | Panagotacos | |
| 8,556,491 B2 | 10/2013 | Lee | |
| 8,651,725 B2 | 2/2014 | Le et al. | |
| 8,714,804 B2 | 5/2014 | Kim et al. | |
| 2002/0113866 A1 | 8/2002 | Taniguchi et al. | |
| 2003/0137738 A1 | 7/2003 | Ozawa et al. | |
| 2004/0108971 A1 | 6/2004 | Waldern et al. | |
| 2004/0170011 A1 | 9/2004 | Kim et al. | |
| 2004/0263968 A1 | 12/2004 | Kobayashi et al. | |
| 2004/0264911 A1 * | 12/2004 | Toeda | G02B 6/0038 385/146 |
| 2005/0135116 A1 | 6/2005 | Epstein et al. | |
| 2005/0180167 A1 | 8/2005 | Hoelen et al. | |
| 2005/0264717 A1 | 12/2005 | Chien et al. | |
| 2005/0276071 A1 | 12/2005 | Sasagawa et al. | |
| 2006/0132423 A1 | 6/2006 | Travis | |
| 2006/0139447 A1 | 6/2006 | Unkrich | |
| 2006/0158729 A1 | 7/2006 | Vissenberg et al. | |
| 2006/0215129 A1 | 9/2006 | Alasaarela et al. | |
| 2006/0269213 A1 | 11/2006 | Hwang et al. | |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0115551 A1 | 5/2007 | Robinson et al. | |
| 2007/0115552 A1 | 5/2007 | Robinson et al. | |
| 2007/0188667 A1 | 8/2007 | Schwerdtner | |
| 2007/0223252 A1 | 9/2007 | Lee et al. | |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0259012 A1 | 10/2008 | Fergason | |
| 2008/0297459 A1 | 12/2008 | Sugimoto et al. | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0067156 A1 | 3/2009 | Bonnett et al. | |
| 2009/0140656 A1 | 6/2009 | Kohashikawa et al. | |
| 2009/0160757 A1 | 6/2009 | Robinson | |
| 2009/0190079 A1 | 7/2009 | Saitoh | |
| 2009/0225380 A1 | 9/2009 | Schwerdtner et al. | |
| 2009/0278936 A1 | 11/2009 | Pastoor et al. | |
| 2009/0303411 A1 * | 12/2009 | Kawato | B29D 11/00605 349/61 |
| 2010/0053771 A1 | 2/2010 | Travis | |
| 2010/0091254 A1 | 4/2010 | Travis | |
| 2010/0165598 A1 | 7/2010 | Chen et al. | |
| 2010/0177387 A1 | 7/2010 | Travis | |
| 2010/0188438 A1 | 7/2010 | Kang | |
| 2010/0188602 A1 | 7/2010 | Feng | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0278480 A1 | 11/2010 | Vasylyev | |
| 2010/0295930 A1 | 11/2010 | Ezhov | |
| 2010/0300608 A1 | 12/2010 | Emerton et al. | |
| 2011/0032483 A1 | 2/2011 | Hiruska et al. | |
| 2011/0044056 A1 | 2/2011 | Travis | |
| 2011/0044579 A1 | 2/2011 | Travis et al. | |
| 2011/0051237 A1 | 3/2011 | Hasegawa et al. | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0242298 A1 | 10/2011 | Bathiche | |
| 2011/0255303 A1 | 10/2011 | Nichol et al. | |
| 2011/0285927 A1 | 11/2011 | Schultz et al. | |
| 2011/0310232 A1 | 12/2011 | Wilson et al. | |
| 2012/0002136 A1 | 1/2012 | Nagata et al. | |
| 2012/0013720 A1 | 1/2012 | Kadowaki et al. | |
| 2012/0127573 A1 | 5/2012 | Robinson et al. | |
| 2012/0243204 A1 | 9/2012 | Robinson et al. | |
| 2013/0101253 A1 | 4/2013 | Popovich et al. | |
| 2013/0135588 A1 | 5/2013 | Popovich et al. | |
| 2013/0258709 A1 * | 10/2013 | Thompson | G02B 6/0025 362/608 |

FOREIGN PATENT DOCUMENTS

| | | |
|---|---|---|
| EP | 2003394 | 12/2008 |
| JP | 08-237691 A | 9/1996 |
| JP | 08254617 A | 10/1996 |
| JP | 08340556 A | 12/1996 |
| JP | 2000-200049 A | 7/2000 |
| JP | 2001093321 A | 4/2001 |
| JP | 2002049004 A | 2/2002 |
| JP | 2003-215705 A | 7/2003 |
| JP | 2004319364 A | 11/2004 |

(56) References Cited

FOREIGN PATENT DOCUMENTS

| JP | 2005135844 A | 5/2005 |
|---|---|---|
| JP | 2005183030 | 7/2005 |
| JP | 2005-259361 A | 9/2005 |
| JP | 2006004877 | 1/2006 |
| JP | 2006031941 A | 2/2006 |
| JP | 3968742 B2 | 8/2007 |
| JP | 2007273288 | 10/2007 |
| JP | 2008204874 A | 9/2008 |
| KR | 1020030064258 | 7/2003 |
| KR | 10-0932304 B1 | 12/2009 |
| KR | 1020110006773 A | 1/2011 |
| KR | 1020110017918 A | 2/2011 |
| KR | 1020110067534 A | 6/2011 |
| KR | 10-2012-004989 A | 5/2012 |
| KR | 1020120048301 A | 5/2012 |
| WO | 2001-061241 A1 | 8/2001 |

OTHER PUBLICATIONS

International search report and written opinion of international searching authority for PCT application PCT/US2013/063125 dated Jan. 20, 2014.
International search report and written opinion of international searching authority for PCT application PCT/US2013/077288 dated Apr. 18, 2014.
International search report and written opinion of international searching authority for PCT application PCT/US2014/017779 dated May 28, 2014.
International search report and written opinion of international searching authority for co-pending PCT application No. PCT/US2013/041192 dated Aug. 28, 2013.
International search report and written opinion of international searching authority for co-pending PCT application No. PCT/US2013/041619 dated Aug. 27, 2013.
International search report and written opinion of international searching authority for co-pending PCT application No. PCT/US2013/041655 dated Aug. 27, 2013.
International search report and written opinion of international searching authority for co-pending PCT application No. PCT/US2013/041703 dated Aug. 27, 2013.
International search report and written opinion of international searching authority for co-pending PCT application No. PCT/US2013/041548 dated Aug. 27, 2013.
International search report and written opinion of international searching authority for co-pending PCT application No. PCT/US2013/041683 dated Aug. 27, 2013.
International search report and written opinion of international searching authority for co-pending PCT application No. PCT/US2013/041228 dated Aug. 23, 2013.
International search report and written opinion of international searching authority for co-pending PCT application No. PCT/US2013/041235 dated Aug. 23, 2013.
International search report and written opinion of international searching authority for co-pending PCT application No. PCT/US2013/041697 dated Aug. 23, 2013.
Tabiryan et al., "The Promise of Diffractive Waveplates," Optics and Photonics News, vol. 21, Issue 3, pp. 40-45 (Mar. 2010).
International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004 ).
International search report and written opinion of the international searching authority from PCT/US12/052189 dated Jan. 29, 2013.
International Preliminary Report on Patentability in PCT/US2011/061511 dated May 21, 2013.
Travis, et al. "Backlight for view-sequential autostereo 3D".

\* cited by examiner

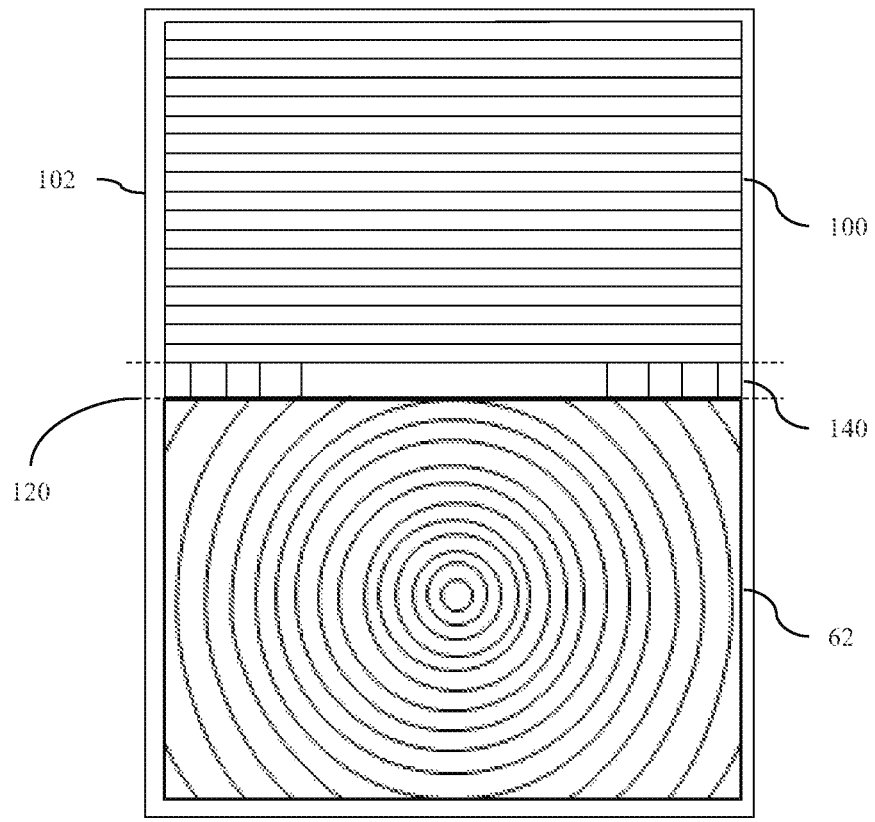
*FIG. 28*
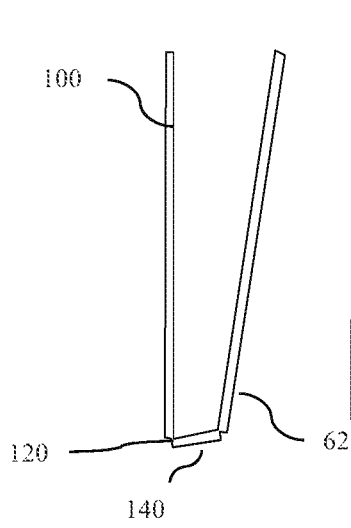 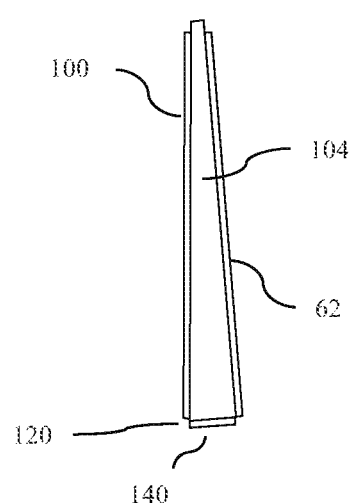
*FIG. 29*          *FIG. 30*

METHOD OF MANUFACTURING DIRECTIONAL BACKLIGHT APPARATUS AND DIRECTIONAL STRUCTURED OPTICAL FILM

CROSS-REFERENCE TO RELATED APPLICATIONS

This application is a continuation-in-part of U.S. patent application Ser. No. 13/300,293, entitled "Directional flat illuminators," filed Nov. 18, 2011, which claims priority to U.S. Provisional Patent Application No. 61/415,810, entitled "Directional flat illuminators," filed Nov. 19, 2010, the entireties of which are herein incorporated by reference. This application also claims priority to U.S. Provisional Application No. 61/649,133, entitled "Method of manufacturing directional backlight apparatus and directional structured optical film," filed May 18, 2012, the entirety of which is herein incorporated by reference.

TECHNICAL FIELD

This disclosure generally relates to manufacturing methods for apparatus for illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a method to form a stepped imaging directional illumination apparatus which may include forming a structured optical film, aligning the common substrate with at least one side of an optical body which may include a taper, and arranging the common substrate on the optical body. The structured film may include a plurality of guiding features and a plurality of extraction features. The extraction features and the guiding features may be connected to and alternate with one another respectively. Additionally, the structured film may include at least one further optical element in approximate alignment with the plurality of guiding features and plurality of extraction features and also may include a common substrate.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

The present embodiments advantageously achieve a convenient and low cost method for manufacturing a stepped waveguide apparatus. At least two different optical functions can be arranged on a single structured optical film and combined with a separate substrate to achieve a stepped imaging directional backlight. Optical functions may include light extraction surfaces, imaging reflectors and lenses, light input coupling optical elements and elements arranged to direct light at the non-guiding sides of the waveguide. Further, many devices can be made in parallel in a roll-to-roll processing manner, thus achieving highly parallel manufacture of large area and large number of devices. Advantageously such structured optical films can be fabricated with low scatter and high efficiency. Further, structured optical films can be conveniently coated over large areas in a continuous process for example with metallic or dichroic coating layers. Further additional optical functions can be incorporated onto the structured optical film surface by attachment of additional elements.

Embodiments herein may provide an autostereoscopic display with large area and thin structure. Further, as will be described, the structured optical film of the present disclosure may be used to achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 28 is a schematic diagram illustrating a front view of a structured optical film for use in a stepped waveguide, in accordance with the present disclosure;

FIG. 29 is a schematic diagram illustrating a side view of an assembly method for a stepped waveguide, in accordance with the present disclosure;

FIG. 30 is a schematic diagram illustrating a side view of an assembly method for a stepped waveguide, in accordance with the present disclosure;

DETAILED DESCRIPTION

Figure 1A:
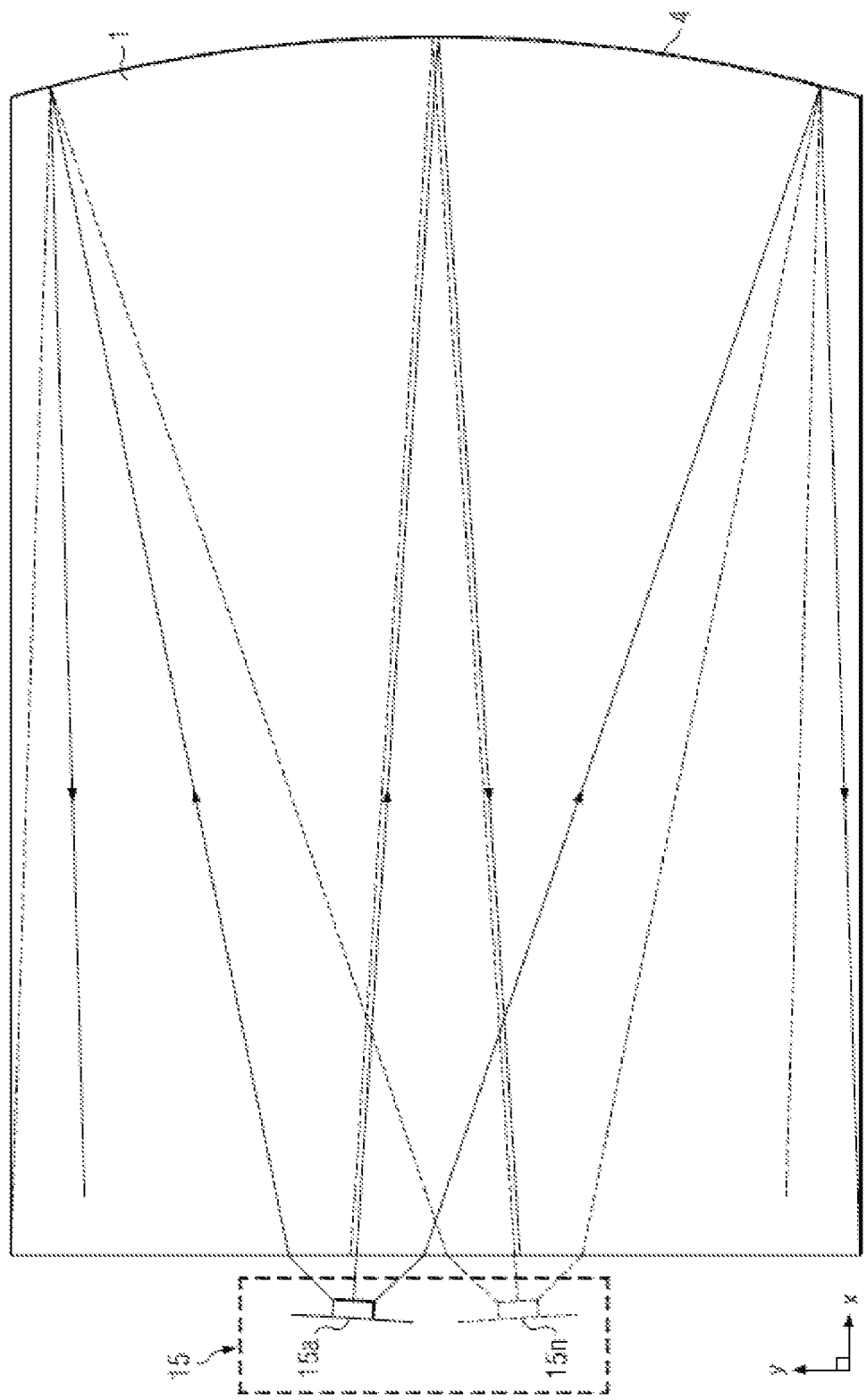
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight comprising a waveguide for guiding light, which may include a first light guiding surface and a second light guiding surface, opposite the first light guiding surface, further comprising a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a nominal window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
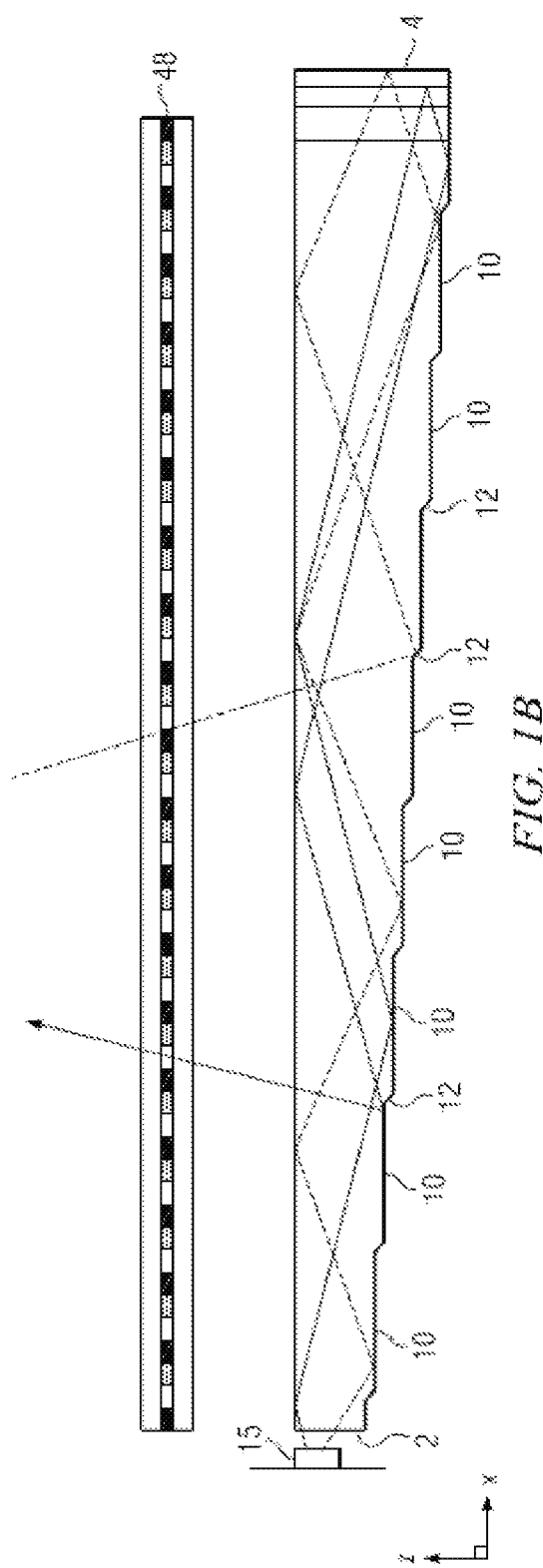
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the optical valve structure of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illuminator elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window.

In the present disclosure an optical window may correspond to the image of a single light source in the window plane, being a nominal plane in which optical windows form across the entirety of the display device. Alternatively, an optical windows may correspond to the image of a groups of light sources that are driven together. Advantageously, such groups of light sources may increase uniformity of the optical windows of the array 121.

By way of comparison, a viewing window is a region in the window plane wherein light is provided comprising image data of substantially the same image from across the display area. Thus a viewing window may be formed from a single optical window or from plural optical windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

In one embodiment, a display device may include a stepped waveguide or light valve which in turn, may include a first guide surface that may be arranged to guide light by total internal reflection. The light valve may include a second guide surface which may have a plurality of light extraction features inclined to reflect light guided through the waveguide in directions allowing exit through the first guide surface as the output light. The second guide surface may also have regions between the light extraction features that may be arranged to direct light through the waveguide without extracting it.

In another embodiment, a display device may include a waveguide with at least a first guide surface which may be arranged to guide light by total internal reflection and a second guide surface which may be substantially planar and inclined at an angle to reflect light in directions that break the total internal reflection for outputting light through the first guide surface, The display device may include a deflection element extending across the first guide surface of the waveguide for deflecting light towards the normal to the SLM 48.

In yet another embodiment, a display device may include a waveguide which may have a reflective end facing the input end for reflecting light from the input light back through the waveguide. The waveguide may further be arranged to output light through the first guide surface after reflection from the reflective end.

Figure 2A:
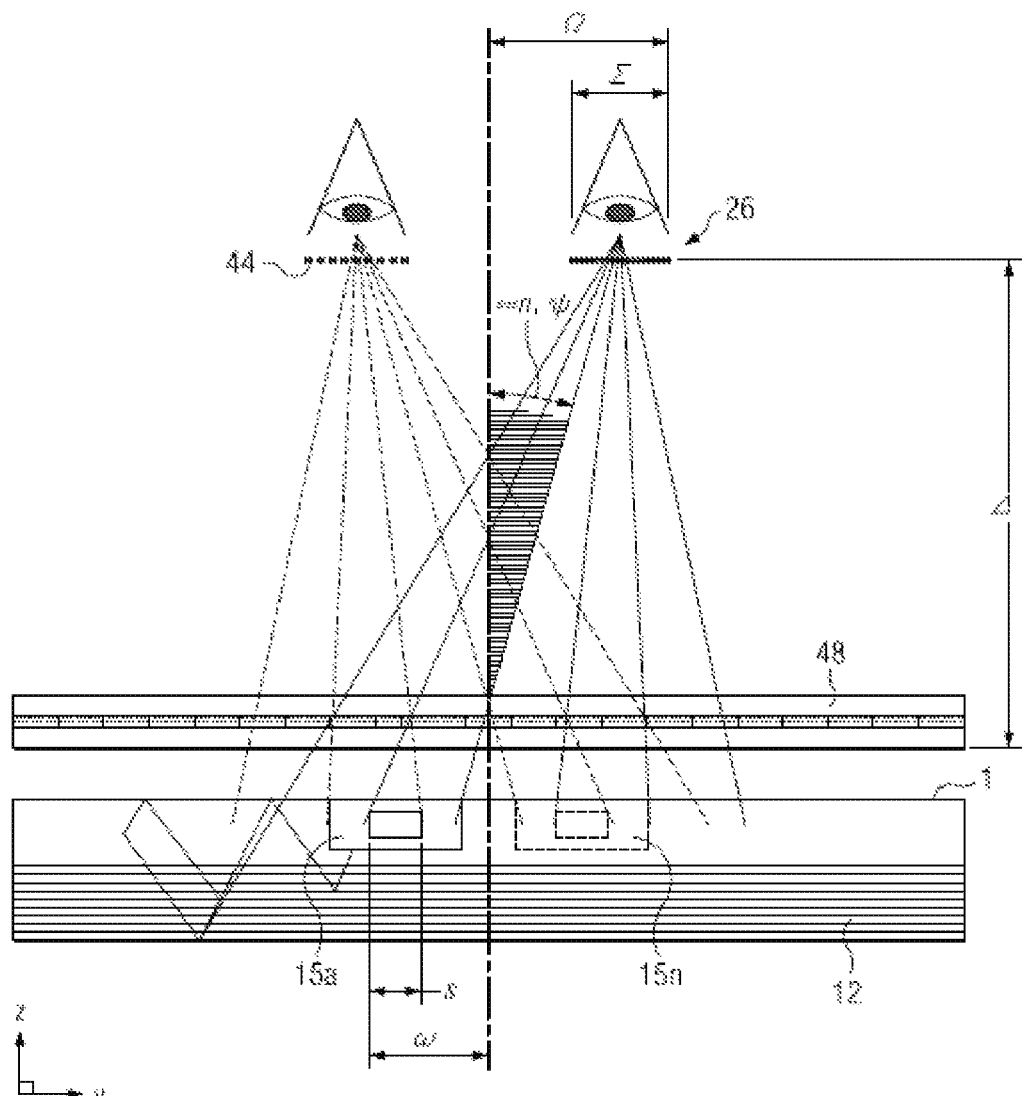
FIG. 2A is a schematic diagram illustrating in a top view of light propagation in another embodiment of a directional display device, in accordance with the present disclosure.
Figure 2B:
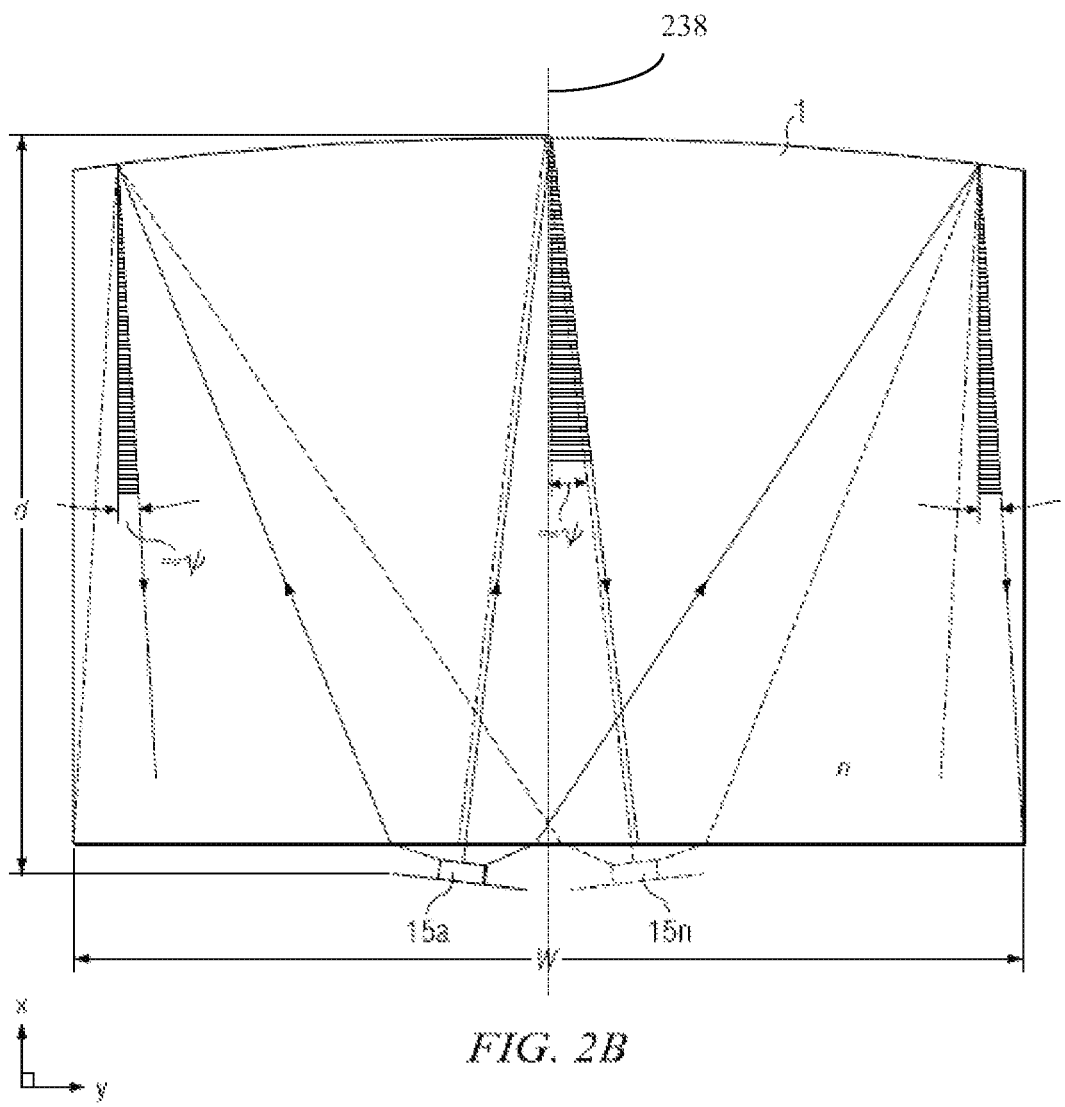
FIG. 2B is a schematic diagram illustrating light propagation in a front view of the directional display device of FIG. 2A, in accordance with the present disclosure.
Figure 2C:
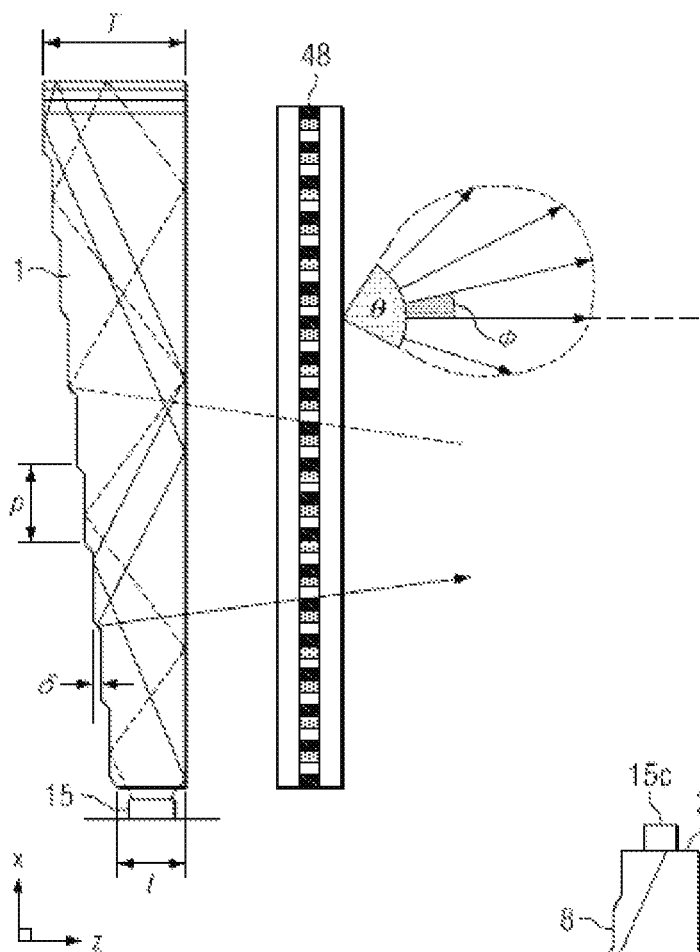
FIG. 2C is a schematic diagram illustrating light propagation in a side view of the directional display device of FIG. 2A, in accordance with the present disclosure.

Illuminating an SLM 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the centre of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
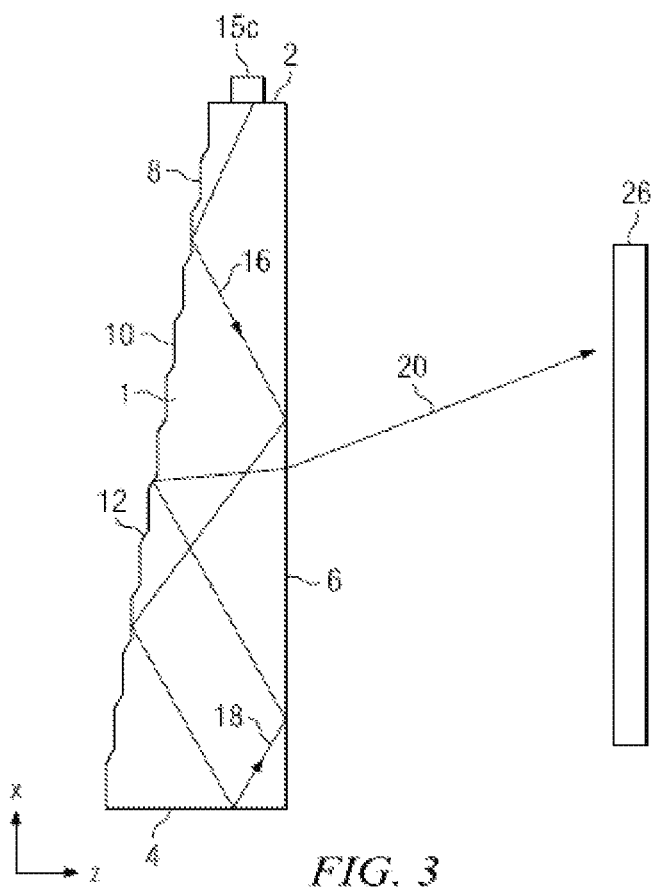
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the SLM 48 that intersect with a plane at the nominal viewing distance.

Figure 4A:
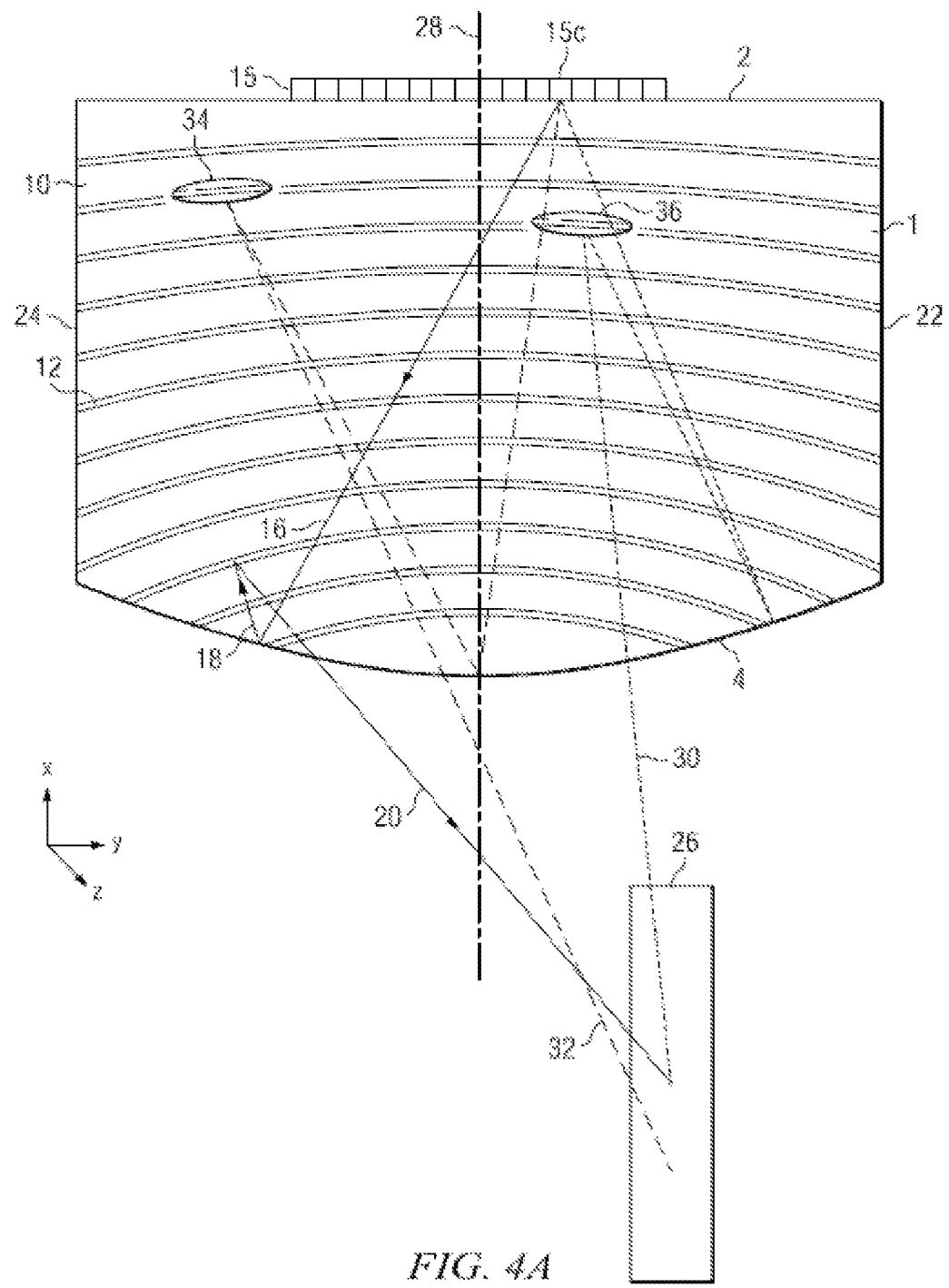
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. In FIG. 4A, the directional backlight may include the stepped waveguide 1 and the light source illuminator array 15. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
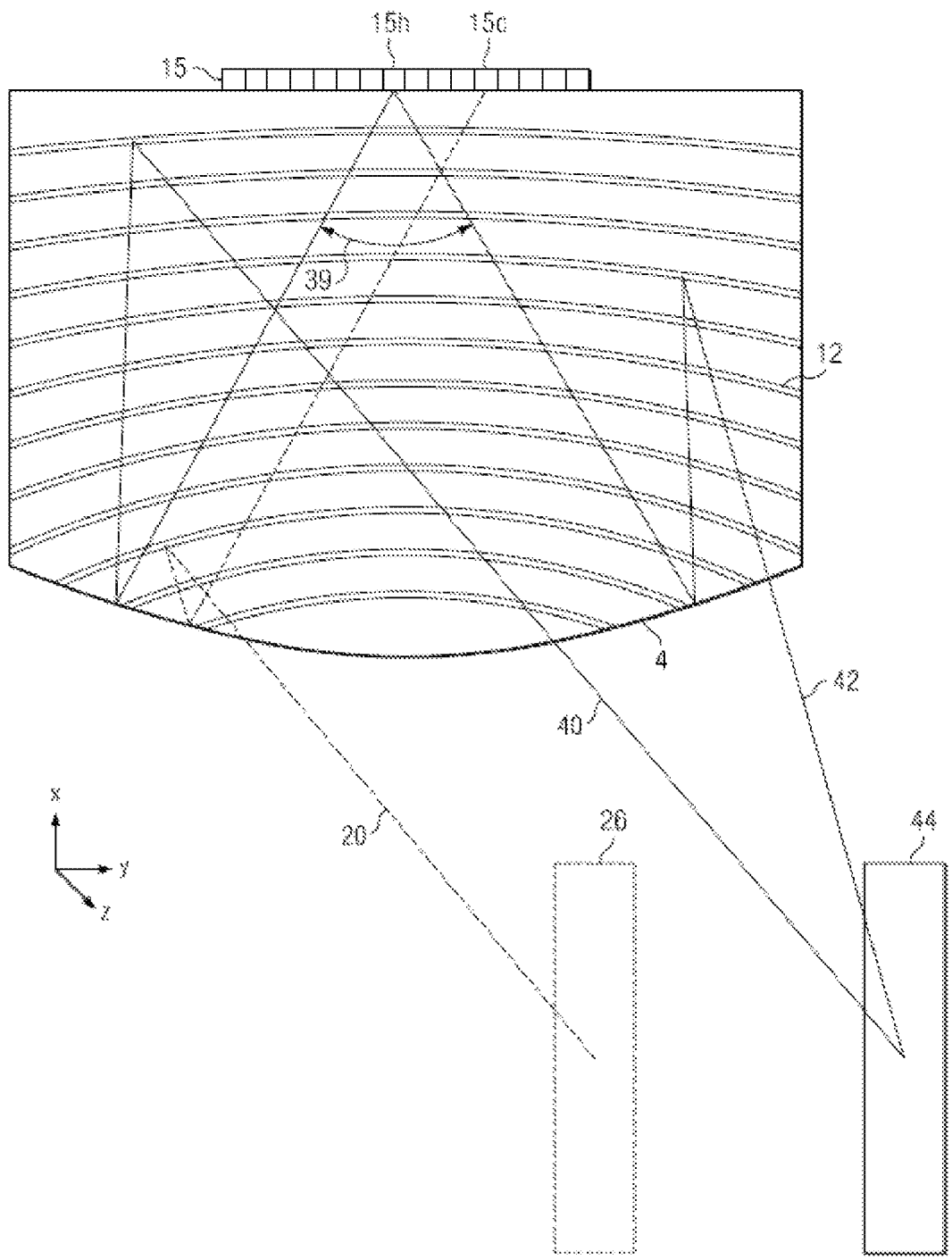
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
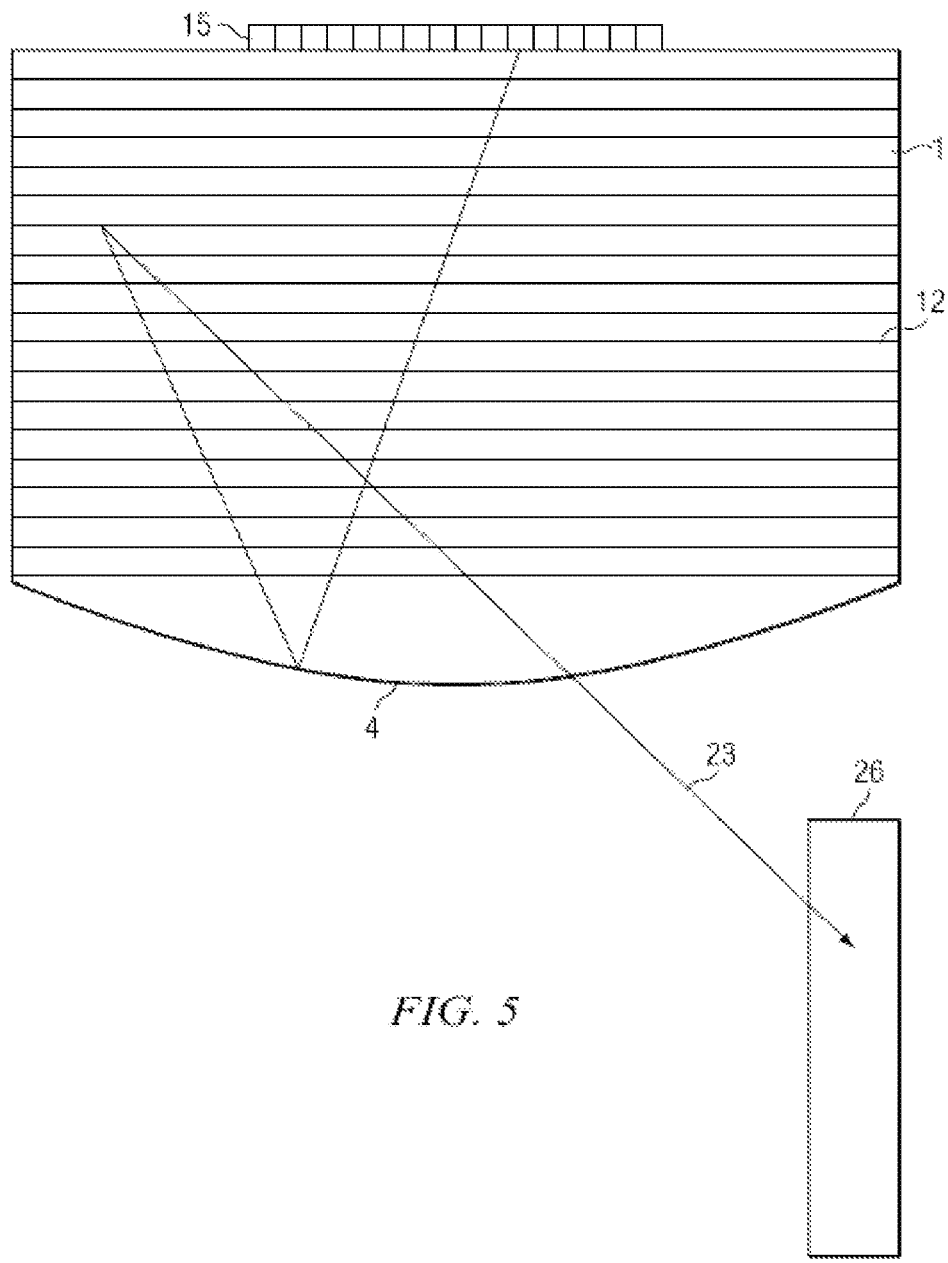
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device comprising a waveguide 1 having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
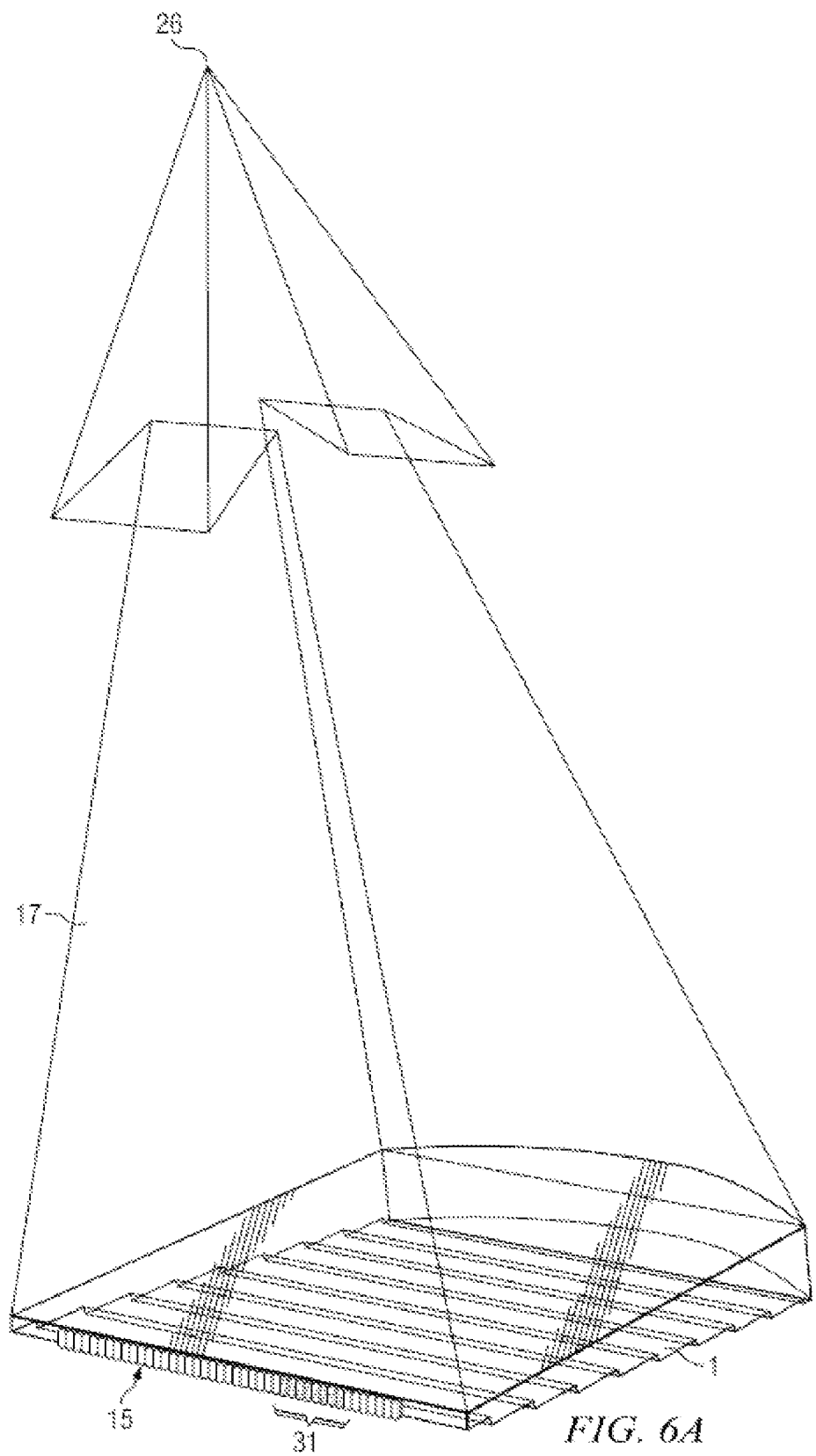
FIG. 6A is a schematic diagram illustrating one embodiment of the generation of a first viewing window in a time multiplexed imaging directional display device in a first time slot, in accordance with the present disclosure.
Figure 6B:
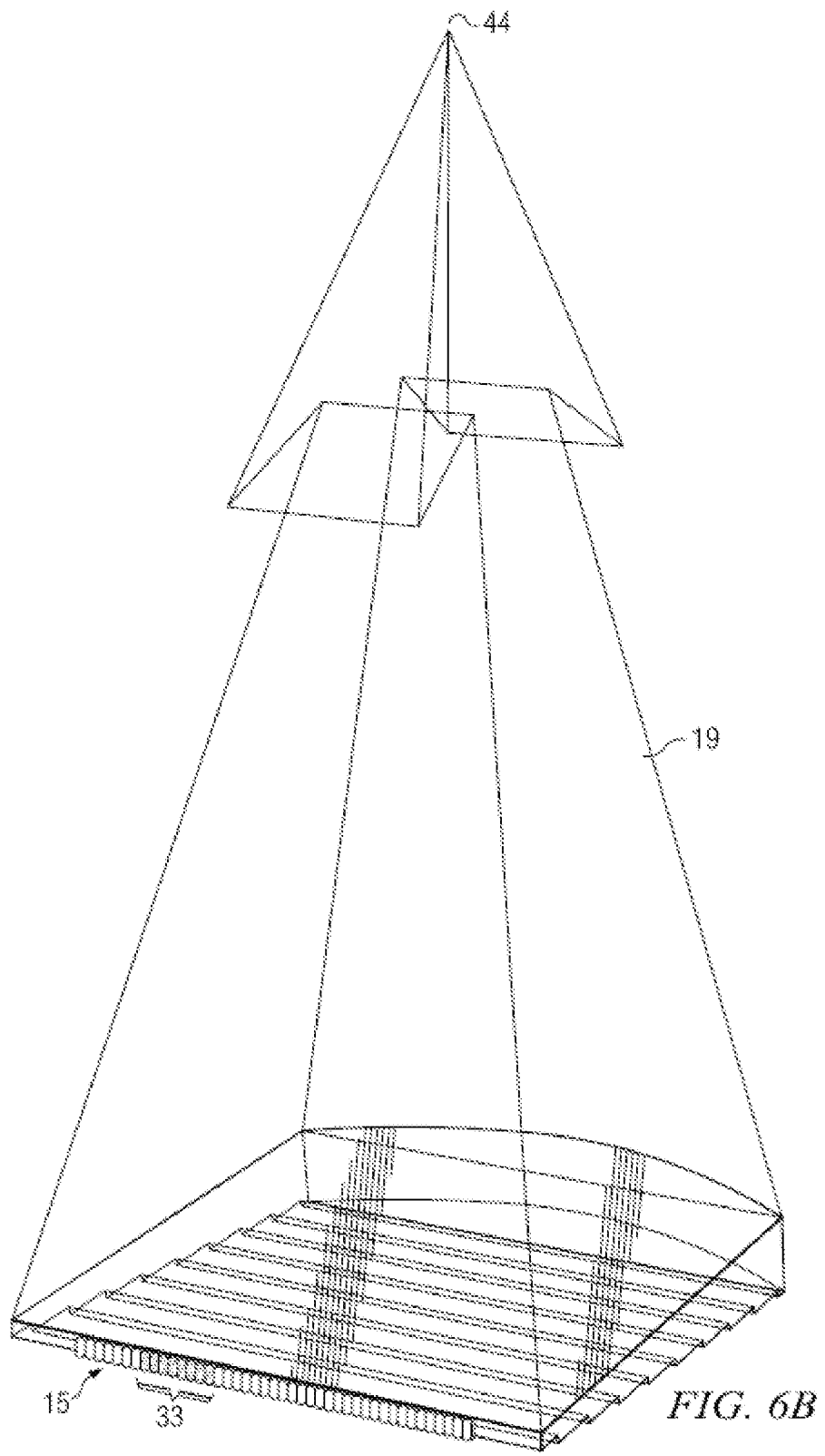
FIG. 6B is a schematic diagram illustrating another embodiment of the generation of a second viewing window in a time multiplexed directional display device in a second time slot, in accordance with the present disclosure.
Figure 6C:
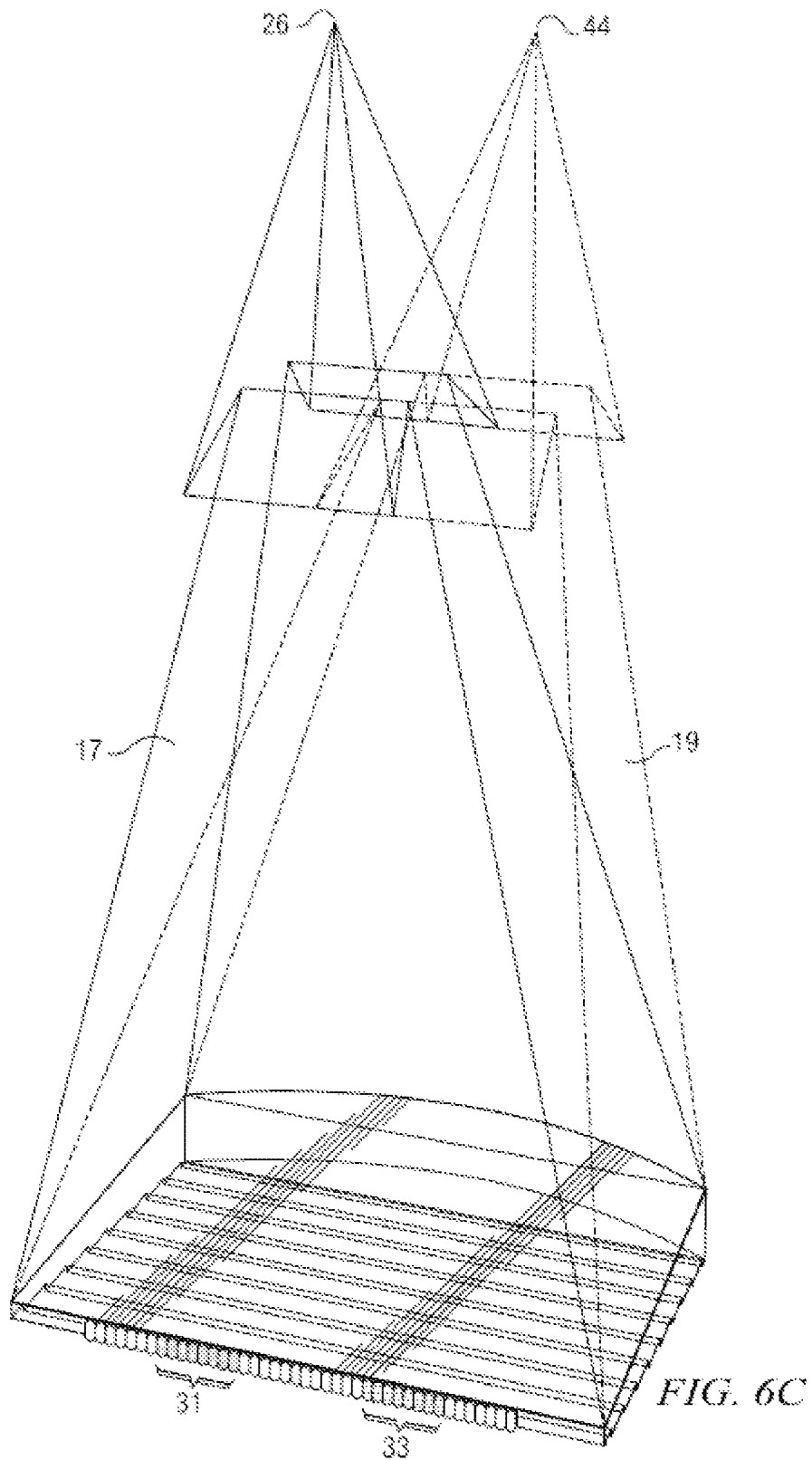
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device, namely an optical valve apparatus in a first time slot. FIG. 6B is a schematic diagram illustrating another embodiment of the generation of a second viewing window in a time multiplexed imaging directional backlight apparatus in a second time slot. FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a SLM 48 (not shown in FIGS. 6A, 6B, 6C) is adjusted in correspondence with the light direction output, then an autostereoscopic image may be achieved for a suitably placed viewer. Similar operation can be achieved with all the directional backlights and directional display devices described herein. Note that illuminator element groups 31, 33 each include one or more illumination elements from illumination elements 15a to 15n, where n is an integer greater than one.

Figure 7:
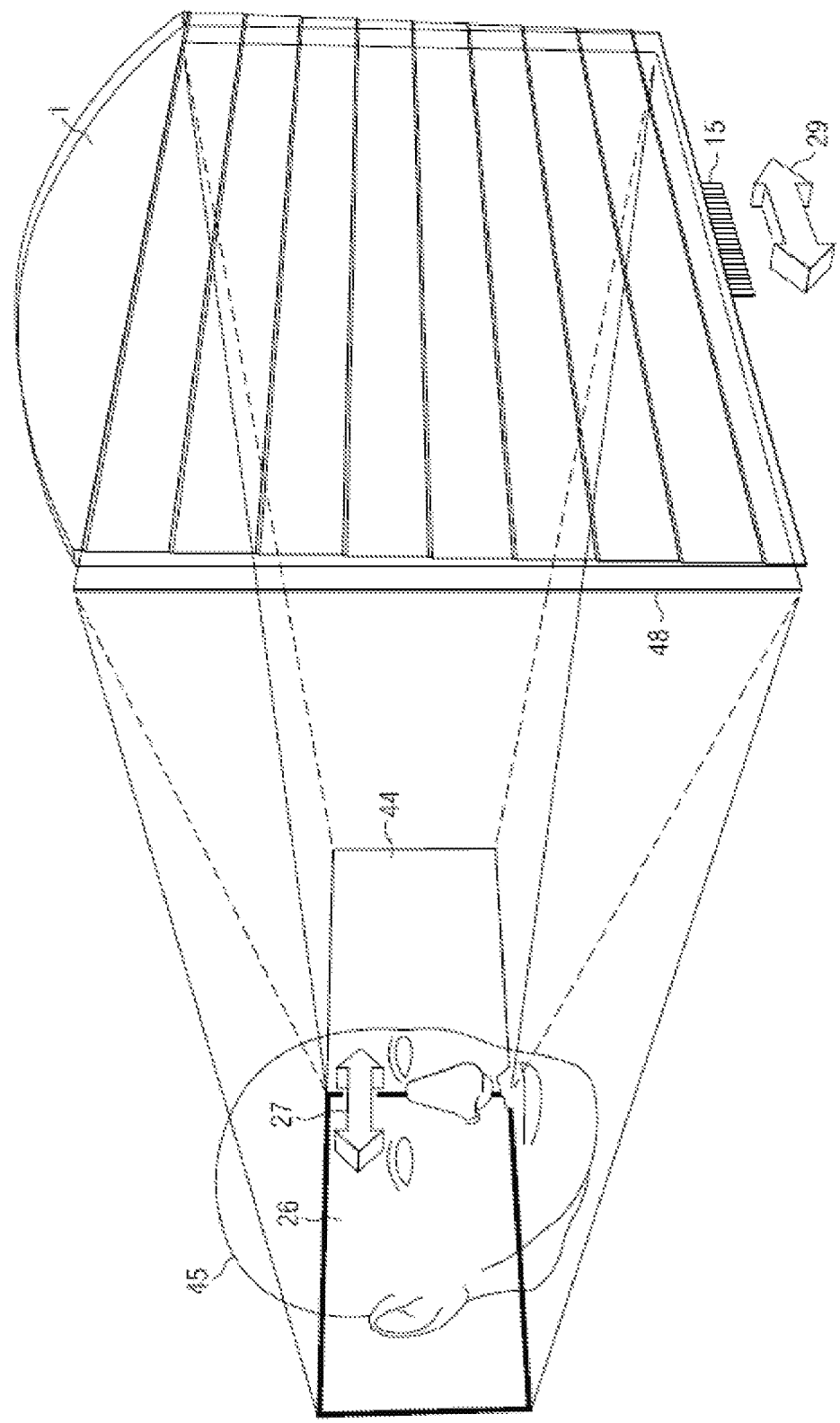
FIG. 7 is a schematic diagram illustrating an observer tracking autostereoscopic display apparatus including a time multiplexed directional display device, in accordance with the present disclosure.

FIG. 7 is a schematic diagram illustrating one embodiment of an observer tracking autostereoscopic directional display device including a time multiplexed directional backlight. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights and directional display devices described herein.

Figure 8:
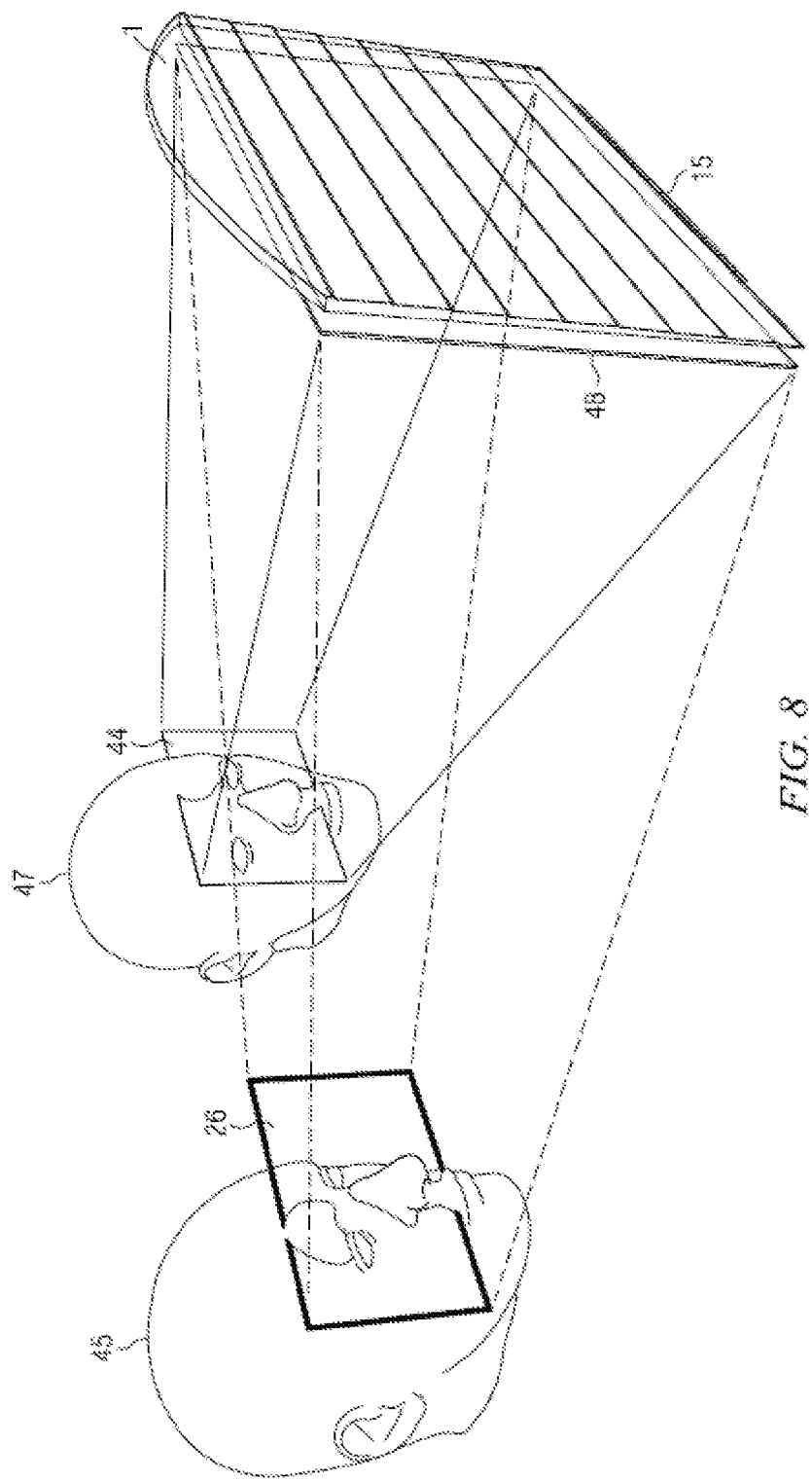
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the SLM 48. The two 2D images of FIG. 8 may be generated in a similar manner as described with respect to FIG. 7 in that the two images would be displayed in sequence and in synchronization with sources whose light is directed toward the two viewers. One image is presented on the SLM 48 in a first phase, and a second image is presented on the SLM 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
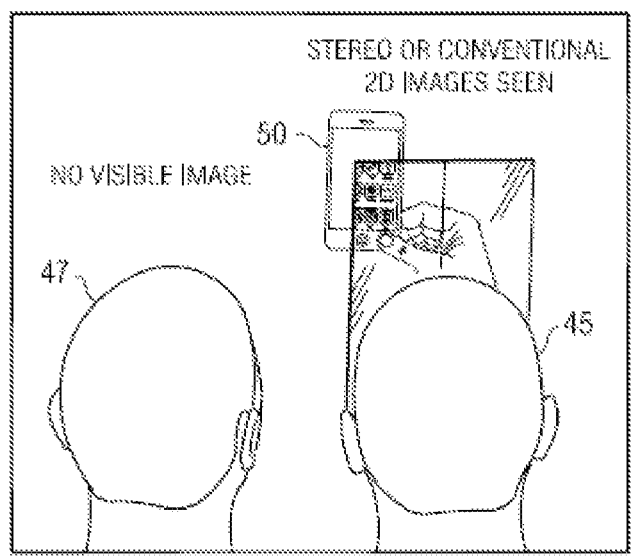
FIG. 9 is a schematic diagram illustrating a privacy directional display device, in accordance with the present disclosure.

FIG. 9 is a schematic diagram illustrating a privacy directional display device which includes an imaging directional backlight. 2D image display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
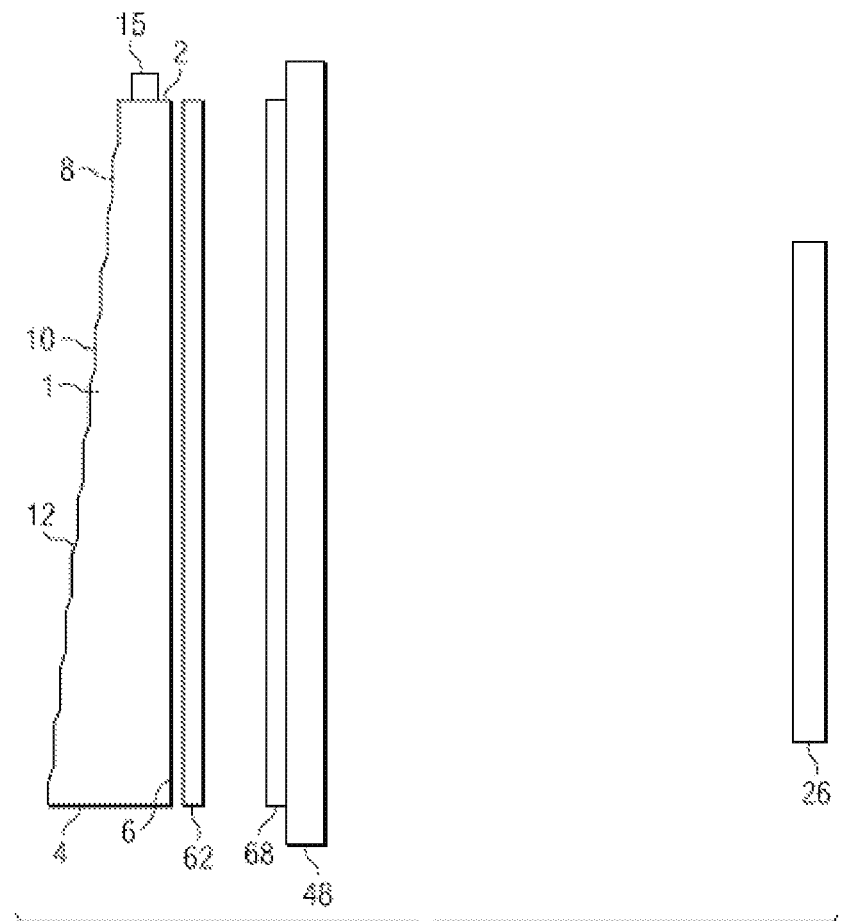
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the SLM 48. Vertical diffusers may incorporate asymmetric diffusion properties, for example to diffuse light in a vertical direction with larger cone angle than in the horizontal (lateral) direction.

The illuminator array 15 may include light emitting diodes (LEDs) that may, for example, be phosphor converted blue LEDs, or may be separate RGB LEDs. Alternatively, the illuminator elements in illuminator array 15 may include a uniform light source and SLM 48 arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 11A:
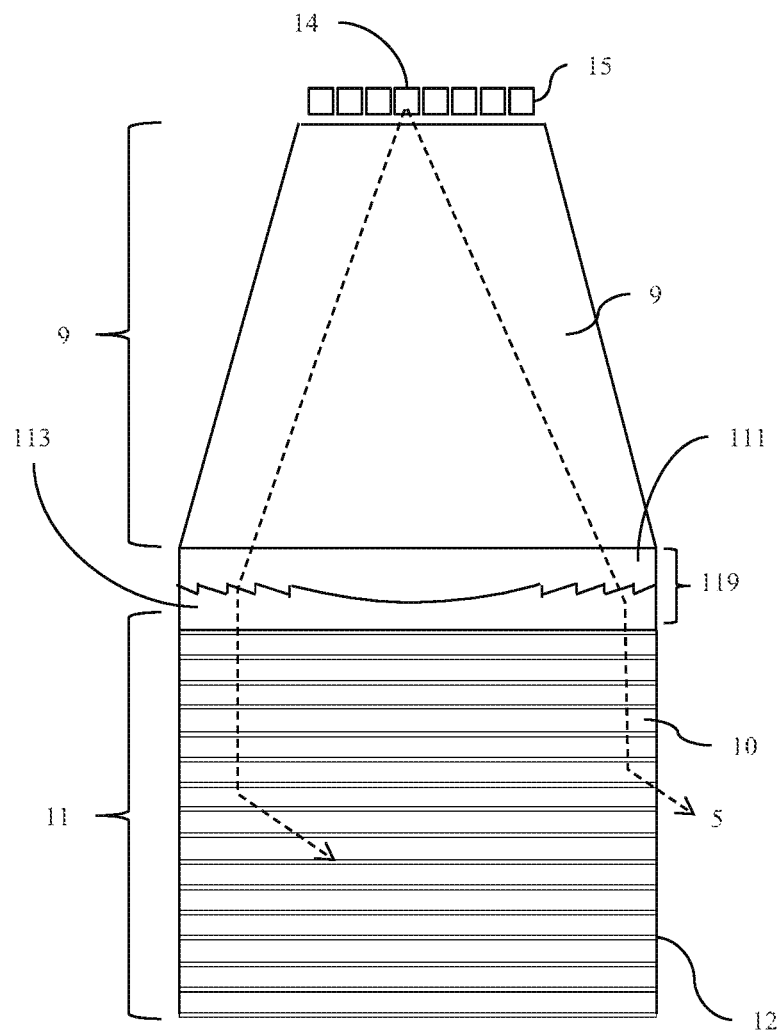
FIG. 11A is a schematic diagram illustrating a plan view of an optical inline directional backlight apparatus, in accordance with the present disclosure.

FIG. 11A is a schematic diagram illustrating a front view of an optical inline directional backlight apparatus as another example of an imaging directional backlight apparatus. Further, FIG. 11A shows another imaging directional backlight apparatus described herein as an optical inline directional backlight. The optical inline directional backlight may operate in a similar manner to the optical valve, with the difference that light may not be reversed at the end interface. Instead, the optical inline directional backlight may allow light to fan out in a guiding region before refracting light approximately half way down its length into a region containing extraction features 12 and in which light may be directed out of the guide and toward a viewer. Light emitted from an illuminator element 15d (e.g., LED) may expand within a guiding region 9 before being redirected with a refractive imaging element 119, which may include in this case, a Fresnel lens surface between dissimilar refractive index materials 111 and 113. Extraction features 12 may extract the light between guiding regions 10 to provide directed rays 5, which may converge to form viewing windows in a similar manner to the optical valve. Effectively, the optical inline directional backlight can be constructed and may operate as an unfolded optical valve in which the reflecting mirror 4 may be replaced by the refractive cylindrical lens 119.

Figure 11B:
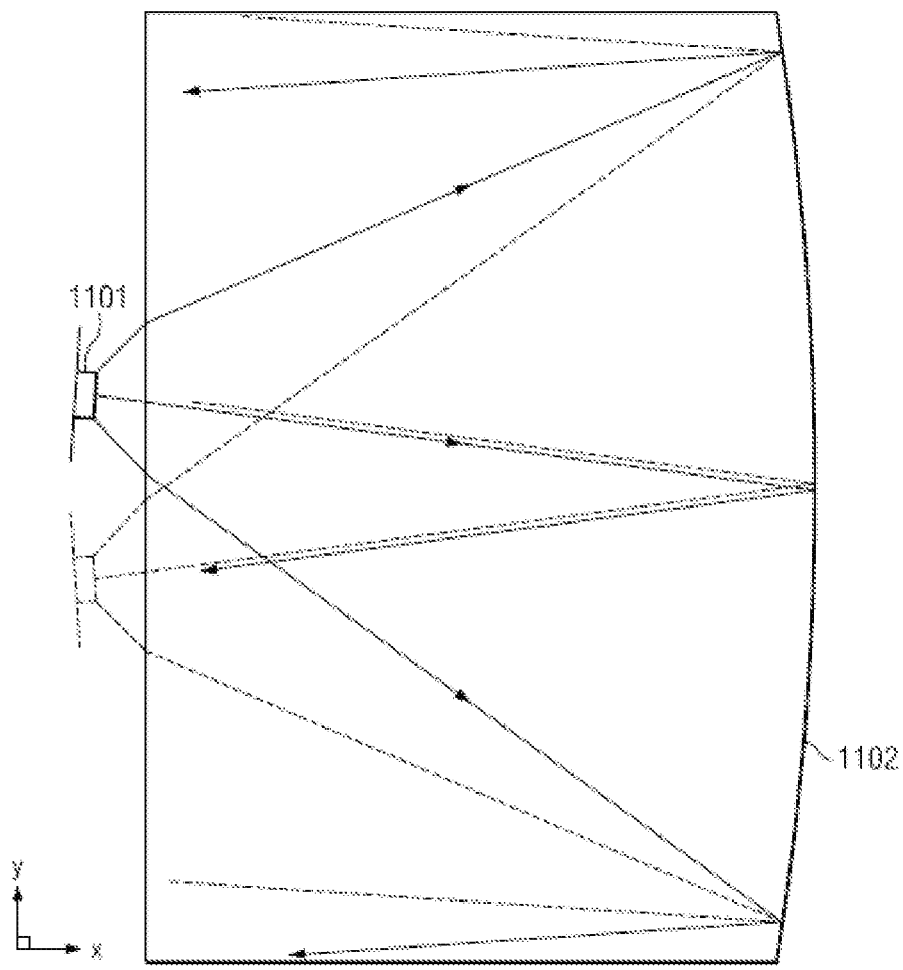
FIG. 11B is a schematic diagram illustrating a front view of a wedge type directional backlight, in accordance with the present disclosure.
Figure 11C:
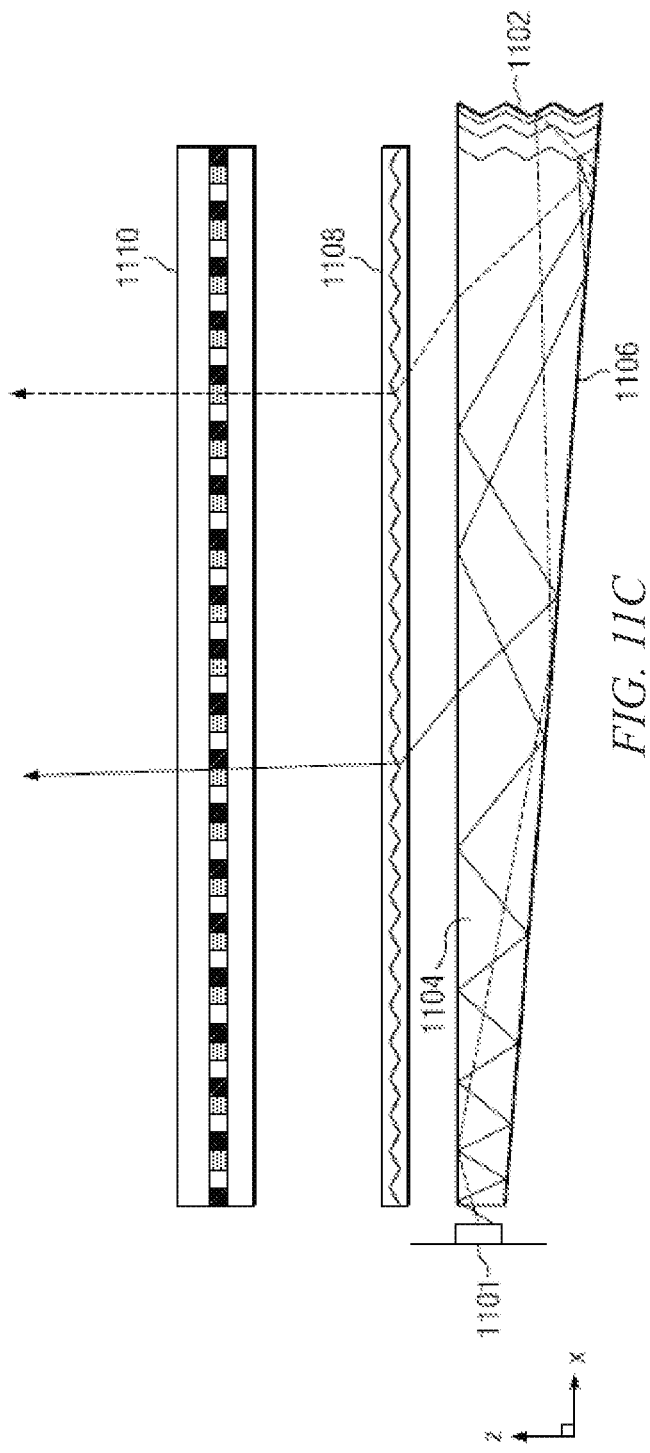
FIG. 11C is a schematic diagram illustrating a side view of a wedge type directional backlight, in accordance with the present disclosure.

FIG. 11B is a schematic diagram illustrating a front view of another imaging directional display device, as illustrated, a wedge type directional backlight, and FIG. 11C is a schematic diagram illustrating a side view of the same wedge type directional display device. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106. As shown in FIG. 11C, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There follows a description of methods to make directional display apparatuses comprising step waveguides. In the following description, the waveguides, directional backlights and directional display devices are based on and incorporate the structures of FIGS. 1 to 11C above. Except for the modifications and/or additional features which will now be described, the above description applies equally to the following waveguides, directional backlights and display devices, but for brevity will not be repeated.

Figure 12A:
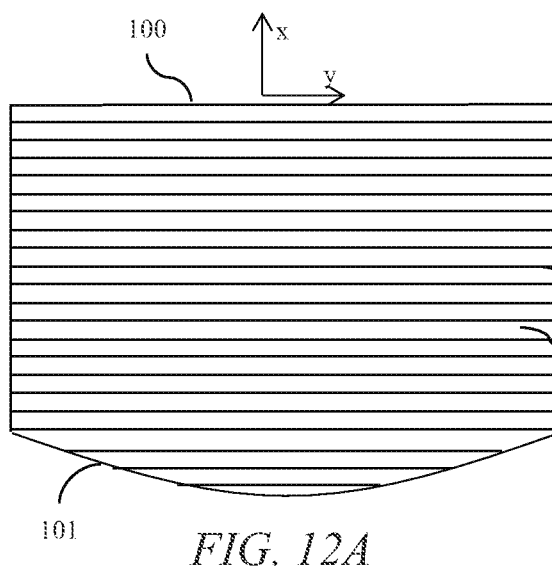
FIGS. 12A-C are schematic diagrams illustrating views of a structured optical film for use in a stepped waveguide, in accordance with the present disclosure.

FIG. 12A is a schematic diagram illustrating a front view of a structured optical film for use in a stepped waveguide. Further, FIG. 12A is a schematic diagram illustrating a structured optical film 100 which may include an array of light extracting features 12 and light guiding features 10. The film 100 may include a curved side 101 arranged to approximately align with the curved side 4 of a tapered body 104 in an assembled stepped waveguide.

Figure 12B:
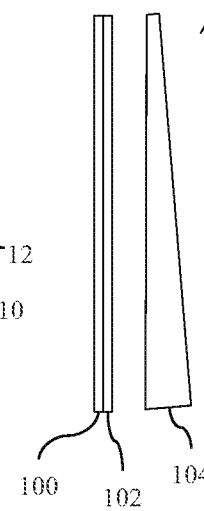
Figure 12C:
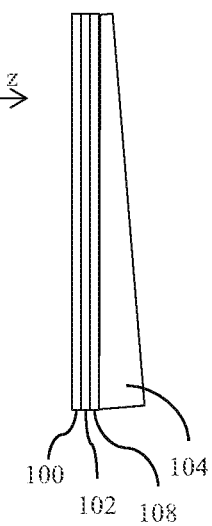

FIG. 12B is a schematic diagram illustrating assembly of a stepped waveguide. Further, FIG. 12B is a schematic diagram illustrating the assembly of a stepped waveguide including the structured optical film 100. Such a film 100 can be arranged with an optical body 104 that may include substantially planar sides, and arranged with a taper along the x-direction. The structured optical film 100 may be formed on substrate 102, for example, on a polymer film such as, but not limited to, PET, PMMA, COC, and so forth. The body 104 may be a plastic substrate that may be substantially the same as the material of substrate 102, or may be a different material, for example, a different plastic or glass. As shown in FIG. 12C, a bonding layer 108 may be formed between the film 102 and body 104 to provide an index matching interface between the structured optical film 100, 102 and the body 104. FIG. 12C is a schematic diagram illustrating assembly of a stepped waveguide. The layer 108 may be formed by a pressure sensitive adhesive, a UV cured adhesive, a thermally cured adhesive, by solvent bonding, and so forth, for example. Advantageously, the processing of the optical structures of the stepped waveguide may be processed in a film 100 rather than in molding of the optical body 104. Thus the high repeatability optical components may be formed in a roll-to-roll processing regime as compared to the batch processing of a single element. Advantageously such an arrangement may achieve reduced cost and higher precision than batch processed elements.

Figure 13A:
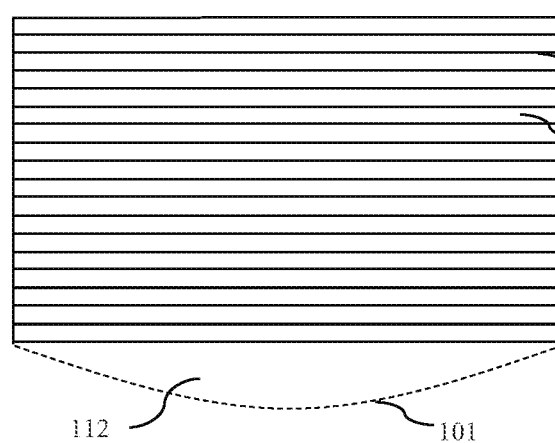
FIGS. 13A-C are schematic diagrams illustrating views of a structured optical film for use in a stepped waveguide, in accordance with the present disclosure.

FIG. 13A is a schematic diagram illustrating a front view of a structured optical film for use in a stepped waveguide. Further, FIG. 13A is a schematic diagram illustrating a further structured optical film 100 including an array of light extracting features 12 and light guiding features 10 in which the features in the segment region 112 bounded by side 101 may be removed. Advantageously in use, little to no light extraction may occur in the segment region so that the output efficiency may be increased.

Figure 13B:
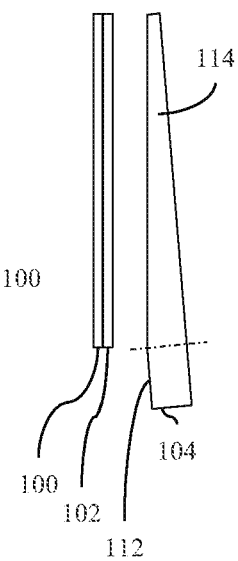
Figure 13C:
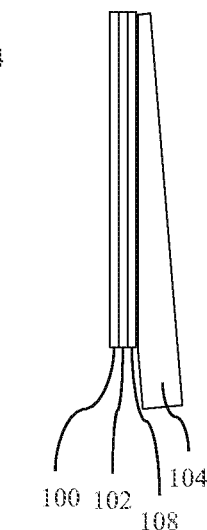

FIG. 13B is a schematic diagram illustrating assembly of a stepped waveguide. Further, FIG. 13B is a schematic diagram illustrating the assembly of a stepped waveguide including the structured optical film 100. Such a staggering artifact in the window profile can be reduced or removed by providing a substantially parallel sided body 104 in the segment region 112, while the region to which the film 100 is attached may be provided by a tapered body. Advantageously such an arrangement may achieve increased light output and reduced window staggering artifact. FIG. 13C is a schematic diagram illustrating assembly of a stepped waveguide. Similar to FIG. 12C, in FIG. 13C, a bonding layer 108 may be formed between the film 102 and body 104 to provide an index matching interface between the structured optical film 100, 102 and the body 104.

Figure 14:
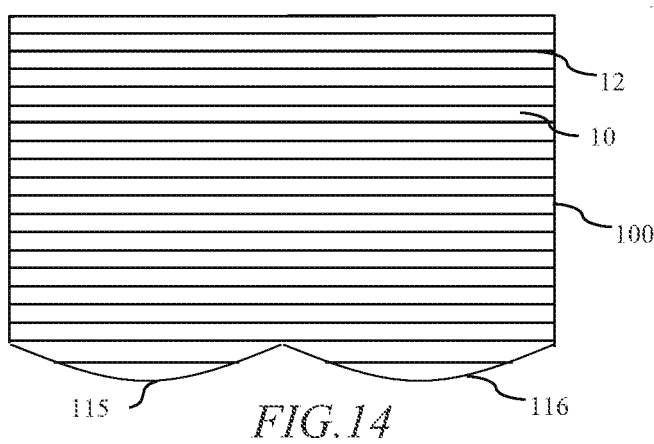
FIG. 14 is a schematic diagram illustrating a front view of a structured optical film for use in a stepped waveguide, in accordance with the present disclosure.

FIG. 14 is a schematic diagram illustrating a front view of a structured optical film for use in a stepped waveguide. Further, FIG. 14 is a schematic diagram illustrating a further structured optical film 100 including multiple curved sides 115, 116 arranged to be approximately aligned with a matching shaped body 104. Such an arrangement can advantageously achieve large display area and increased f-number, thus reducing off-axis aberrations in observer tracking displays. Further, the features 10, 12 may be substantially continuous so that the visibility of the boundary between the two sides 115, 116 is minimized and thus display uniformity may be optimized.

Figure 15:
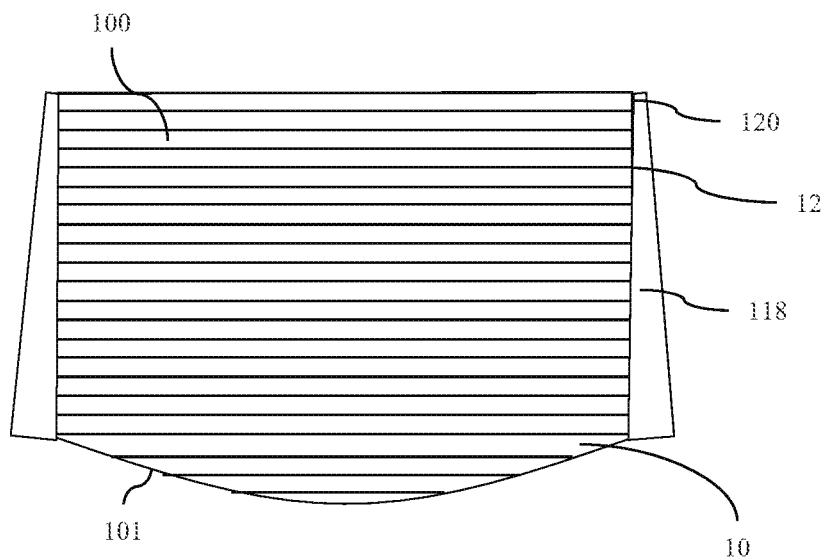
FIG. 15 is a schematic diagram illustrating a front view of a structured optical film for use in a stepped waveguide, in accordance with the present disclosure.
Figure 16A:
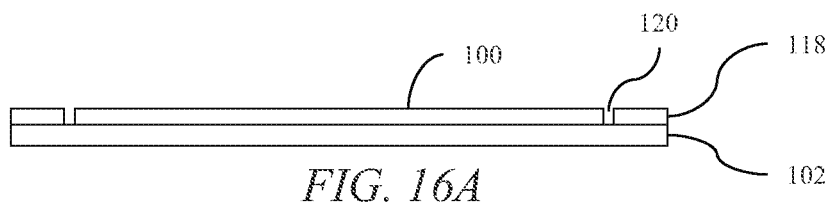
FIGS. 16A-D are schematic diagrams illustrating side views of an assembly method for a stepped waveguide, in accordance with the present disclosure.
Figure 16B:
Figure 16C:
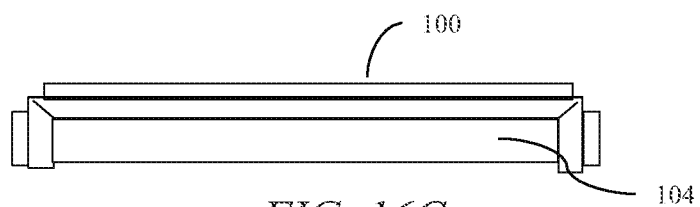
Figure 16D:
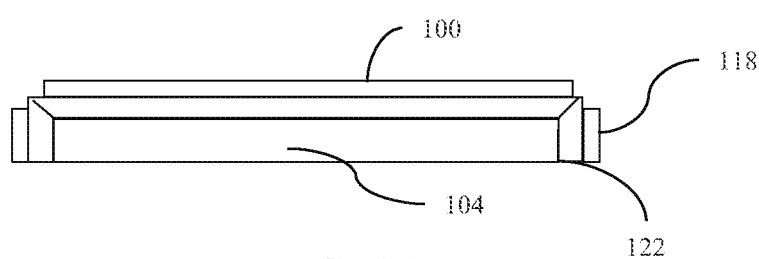

FIG. 15 is a schematic diagram illustrating a front view of a structured optical film for use in a stepped waveguide. Further, FIG. 15 is a schematic diagram illustrating a further structured optical film 100 including edge regions 118 and separated from the light extraction region which may include features 10, 12 by means of boundary 120. Edge regions 118 may include a substantially planar layer that may be metallized, may have other coatings, or may have optical structures as described herein. Advantageously, the optical surface of the stepped waveguide may be formed on a film separately to the body, and thus may be provided at low cost and in high volume by roll-to-roll processing methods. Advantageously the edge regions 118 may be arranged to achieve increased angle of view of the stepped waveguide during operation as generally discussed in U.S. patent application Ser. No. 13/839,552, entitled "Wide angle imaging directional backlights"), which may be referred to herein as an "Wide angle imaging directional backlights" which is herein incorporated by reference in its entirety.

FIGS. 16A-D are schematic diagrams illustrating a side view of one method of assembly for a stepped waveguide comprising a structured optical film 100. Further, FIGS. 16A-D are schematic diagrams illustrating a method to form a stepped waveguide. In a first step shown in FIG. 16A, optical film 100 and regions 118 may be formed on the upper side of the substrate 102. In a second step shown in FIG. 16B the substrate 102 may be removed or weakened, for example, by scribing or cutting to produce a cut 121 in the region of the boundary 120 on the lower side of the substrate 102. The cut may be through part of the thickness of the substrate 102. In a third step shown in FIG. 16C, the substrate 102 may be arranged with the body 104 and substrate 102 which may include regions 118 folded so that regions 118 may be approximately aligned with the sides of the body 104. In a fourth step shown in FIG. 16D, the substrate 102 and regions 122 may be finished, for example, by cutting away extra film 100 to provide a substantially planar lower surface to the assembled structure.

The film 100 may be provided with a metallized coating so that the side 4 of the assembled stepped waveguide is fully metallized after the assembly step. Alternatively, a metallization may be formed on the side 4 of the assembled body 104 and film 100 after assembly. Advantageously the post metallization more conveniently achieves a high area coverage of the metallization material without a seam between the optical body 104 and film 100. Alternatively, the film 100 and body 104 can be pre-metallized and a final reflective layer formed on the assembled stepped waveguide to achieve a uniform reflectivity at the side 4 of the stepped waveguide.

Figure 17A:
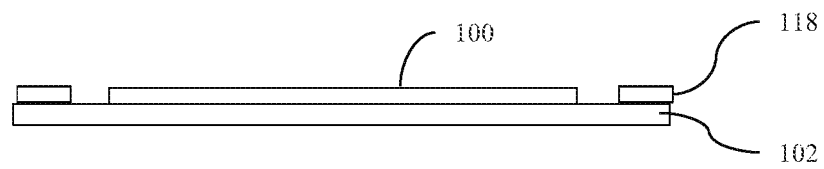
FIGS. 17A-E are schematic diagrams illustrating side views of an assembly method for a stepped waveguide, in accordance with the present disclosure.
Figure 17B:
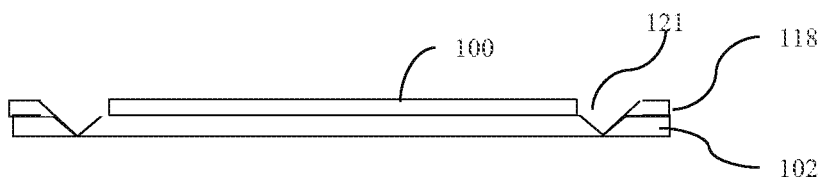
Figure 17C:
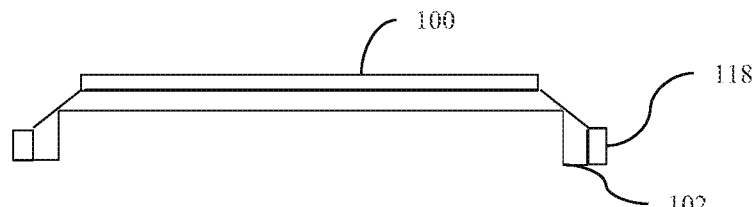
Figure 17D:
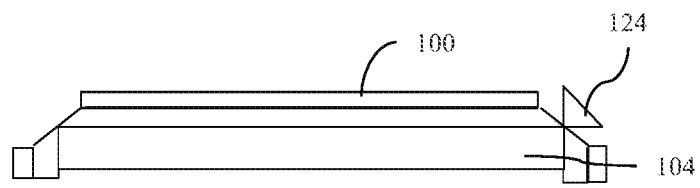
Figure 17E:
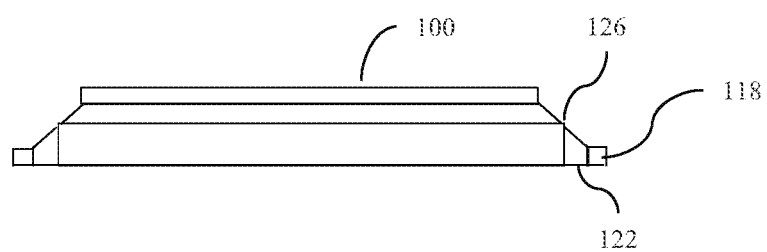

FIGS. 17A-E are schematic diagrams illustrating a side view of an assembly method for a stepped waveguide. Further, FIGS. 17A-E are schematic diagrams illustrating a method to form a stepped waveguide. After forming film 100 and regions 118 shown in FIG. 17A, the substrate 102 may be cut in region 120 on the upper side as shown in FIG. 17B. The substrate may then be folded in another step shown in FIG. 17C and attached to the body 104 as shown in FIG. 17D. After attachment, a cutting tool 124 may be used to remove additional material in the boundary 120 to provide a gap 126 as shown in FIG. 17E in the separated regions, thus reducing stress during attachment of the substrate 102 to the body 104.

Figure 18:
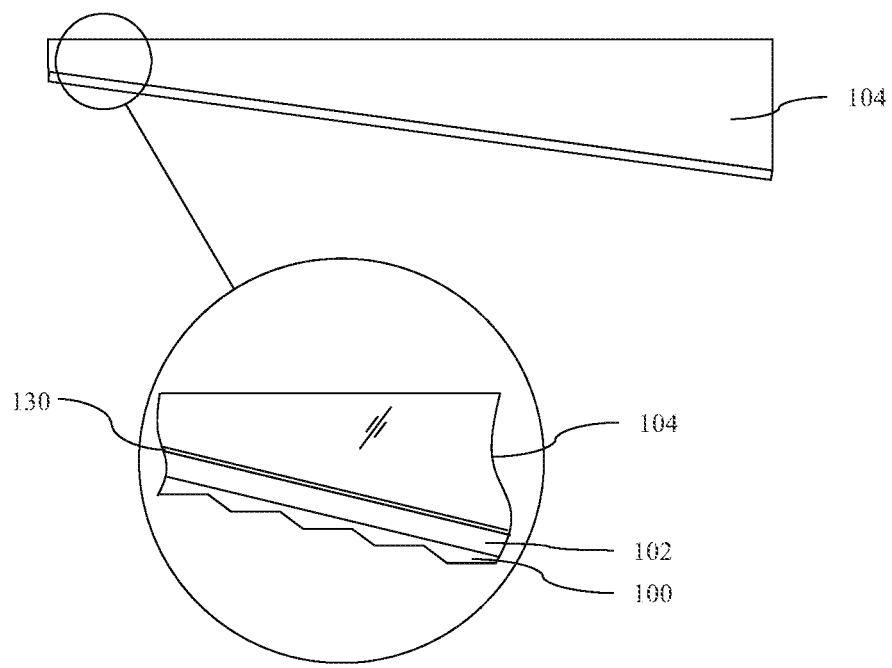
FIG. 18 is a schematic diagram illustrating a side view of a structured optical film for a stepped waveguide in accordance with the present disclosure.

FIG. 18 is a schematic diagram illustrating a side view of a stepped waveguide including a structured optical film. Further, FIG. 18 is a schematic diagram illustrating a side view of an optical body 104 and an attached film 100. A layer 130 may be incorporated to provide index matching of the film 100 and substrate 102 to the body 104. The layer 130 may include an adhesive or may be formed by solvent bonding between the substrate 102 and body 104. In an alternative embodiment, the substrate 102 may be omitted and the film 100 bonded adjacently or directly onto the body 104.

Figure 19:
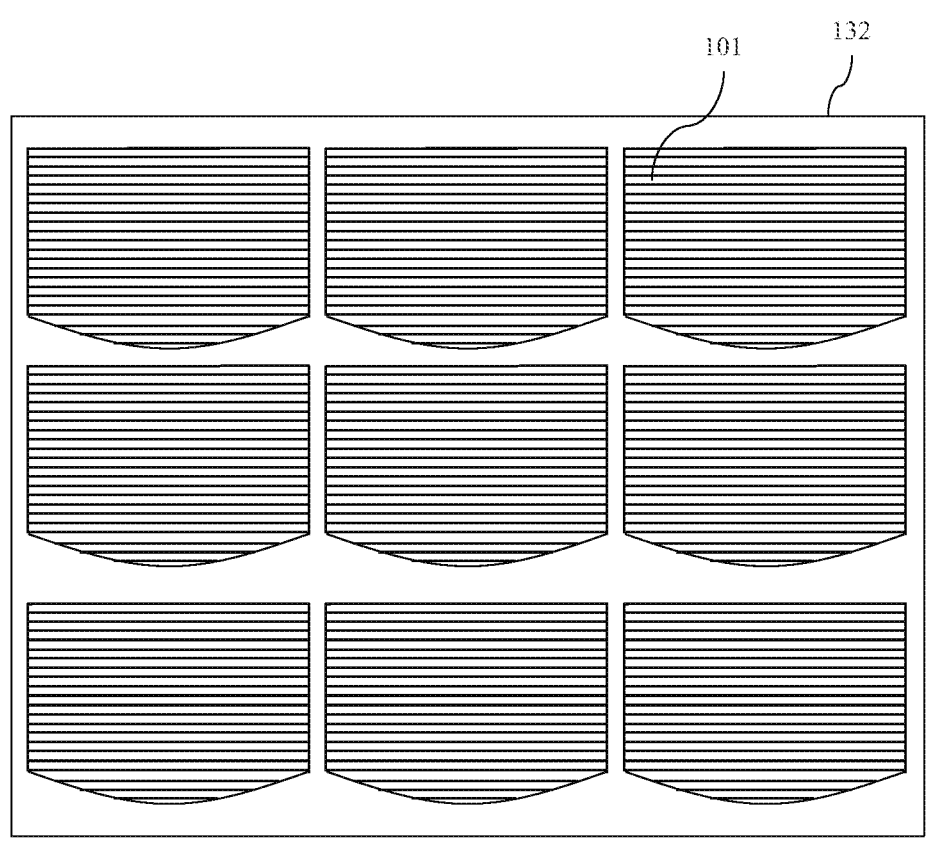
FIG. 19 is a schematic diagram illustrating a side view of a tool for fabrication of a structured optical film, in accordance with the present disclosure.

FIG. 19 is a schematic diagram illustrating a side view of a tool for fabrication of a structured optical film. Further, FIG. 19 is a schematic diagram illustrating a first arrangement of a surface relief stamp 132 that may be used to form an array of films 100. The stamp may be arranged with an array of structured regions 101, each with the inverse shape of the structured optical film 100. The stamp may be arranged to provide a large area film including multiple films 100 by means of a replication method. The replication method may include, but is not limited to, UV embossing, hot embossing, injection molding, other known replication methods, or any combination thereof. The films 100 may be extracted from the film by cutting after replication.

Figure 20:
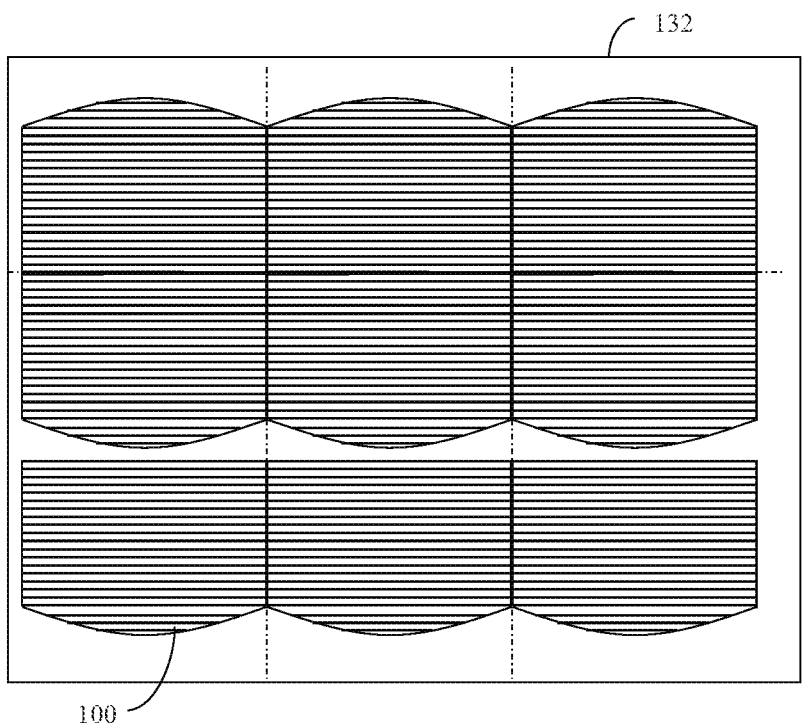
FIG. 20 is a schematic diagram illustrating a side view of a tool for fabrication of a structured optical film, in accordance with the present disclosure.
Figure 21:
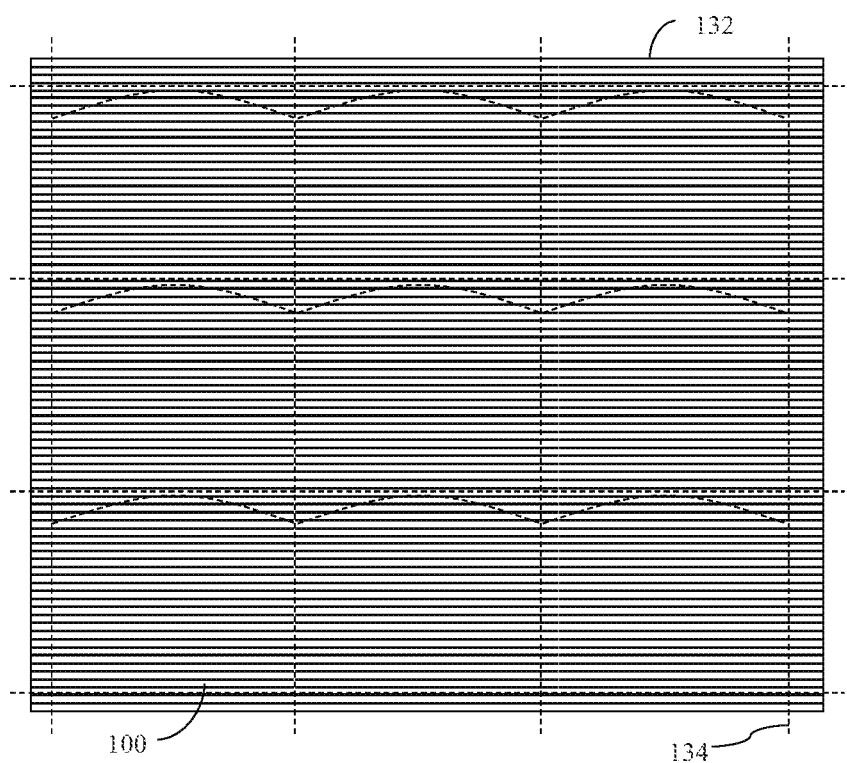
FIG. 21 is a schematic diagram illustrating a side view of a tool for fabrication of a structured optical film, in accordance with the present disclosure.

FIG. 20 is a schematic diagram illustrating a side view of a tool for fabrication of a structured optical film, and FIG. 21 is a schematic diagram illustrating a side view of a tool for fabrication of a structured optical film. Further, FIGS. 20 and 21 are schematic diagrams illustrating further arrangements of a surface relief stamp 132 that may be used to form an array of films 100. FIG. 20 advantageously may increase the area utilization and may employ less cutting as compared to FIG. 19. FIG. 21 may provide a substantially continuous area of structure from which separate films may be extracted after replication for example by die cutting. Moreover, FIG. 21 may enable different shape and sizes of stepped waveguides which may be formed from the same film 100.

Figure 22:
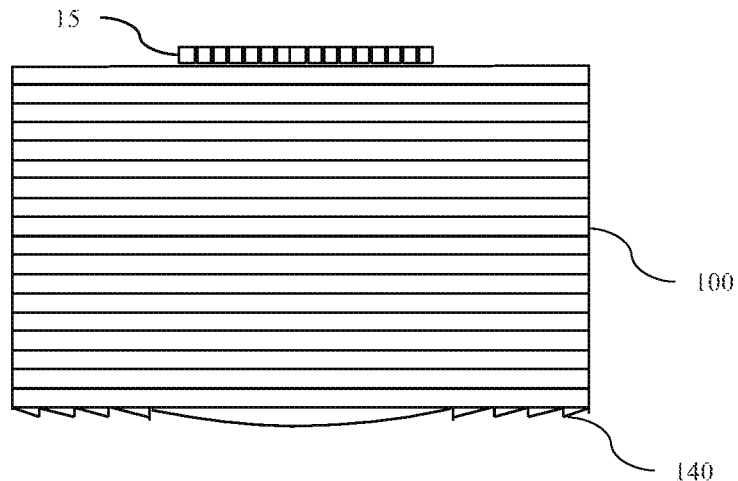
FIG. 22 is a schematic diagram illustrating a stepped imaging directional backlight, in accordance with the present disclosure.
Figure 23:
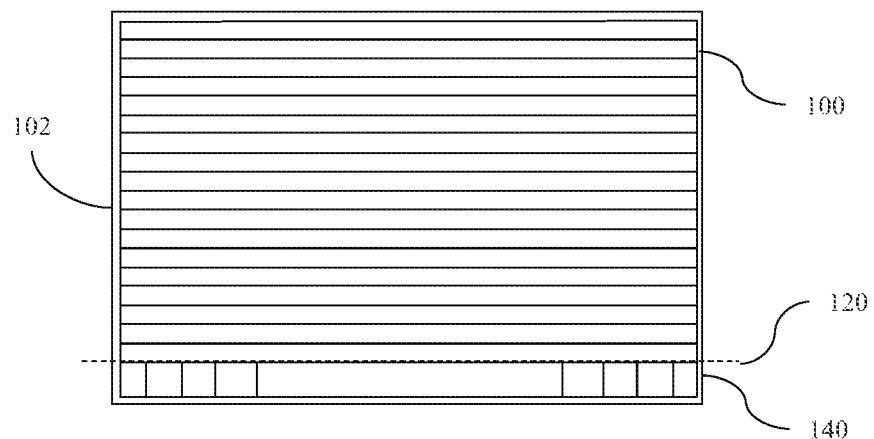
FIG. 23 is a schematic diagram illustrating a front view of a structured optical film for use in a stepped waveguide, in accordance with the present disclosure.

FIG. 22 is a schematic diagram illustrating a stepped imaging directional backlight, and FIG. 23 is a schematic diagram illustrating a front view of a structured optical film for use in a stepped waveguide. Further, FIG. 22 is a schematic diagram illustrating a stepped waveguide apparatus including a reflective Fresnel element 140 arranged on side 4 of the respective waveguide. Advantageously, such an arrangement may provide optical power to light from the light emitting element array 15 while achieving a reduction in the section 112 under the reflecting surface. Further, FIG. 23 is a schematic diagram illustrating a structured optical film 100. Thus, reflective Fresnel element 140 can be formed by a second surface relief optical structure on the same substrate 102 as the structured optical film 100, separated by boundary 120. Advantageously such an arrangement can be formed on a large area sheet in a small number of replication operations and in a single 2D plane and is thus well suited to low cost roll-to-roll processing.

Figure 24:
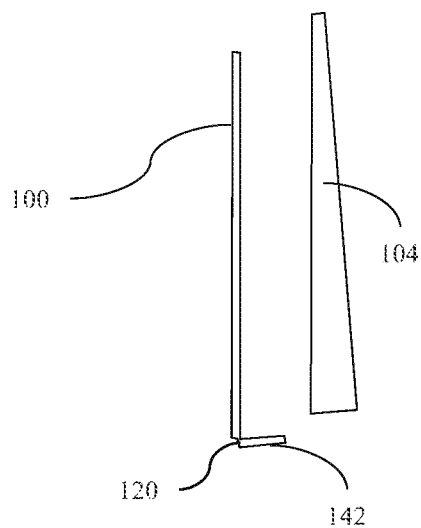
FIG. 24 is a schematic diagram illustrating a side view of an assembly method for a stepped waveguide, in accordance with the present disclosure.
Figure 25:
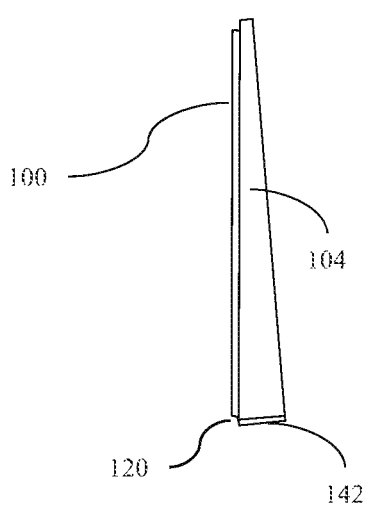
FIG. 25 is a schematic diagram illustrating a side view of an assembly method for a stepped waveguide, in accordance with the present disclosure.

FIG. 24 is a schematic diagram illustrating a side view of an assembly method for a stepped waveguide. Further, FIG. 24 is a schematic diagram illustrating a side view of the assembly of a stepped waveguide including the structured optical film 100 and Fresnel lens element 142. Prior to assembly, the substrate 102 (for illustrative convenience not shown in FIG. 24) may be scored at boundary 120 and the substrate 102 may be folded. The substrate 102 may then be approximately aligned with the body 104 as illustrated in schematic diagram FIG. 25. FIG. 25 is a schematic diagram illustrating a side view of an assembly method for a stepped waveguide. Advantageously, approximate alignment between reflective Fresnel element 140 and structured optical film 100 can be achieved at the time of replication, rather than employing two separate alignment steps when the elements are attached to body 104, such that the film 100 and element 140 may remain approximately aligned during the attachment to the body 104.

Figure 26:
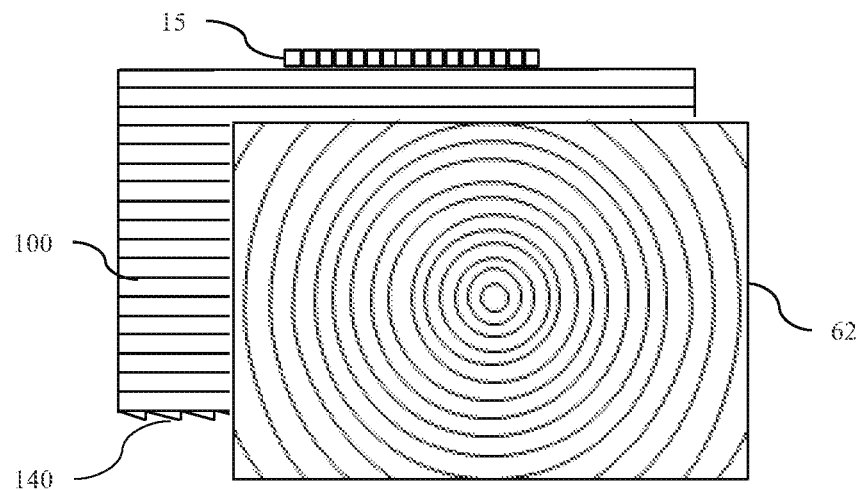
FIG. 26 is a schematic diagram illustrating a stepped imaging directional backlight, in accordance with the present disclosure.

FIG. 26 is a schematic diagram illustrating a stepped imaging directional backlight. Further, FIG. 26 is a schematic diagram illustrating a stepped waveguide optical valve apparatus including a reflective Fresnel element 140 arranged on side 4 of the respective stepped waveguide and a transmissive Fresnel element 62 arranged on side 6 of the respective stepped waveguide. Advantageously such an arrangement can distribute optical power between the elements 140, 62 thus reducing total aberrations of the system, and reducing off-axis cross talk.

Figure 27:
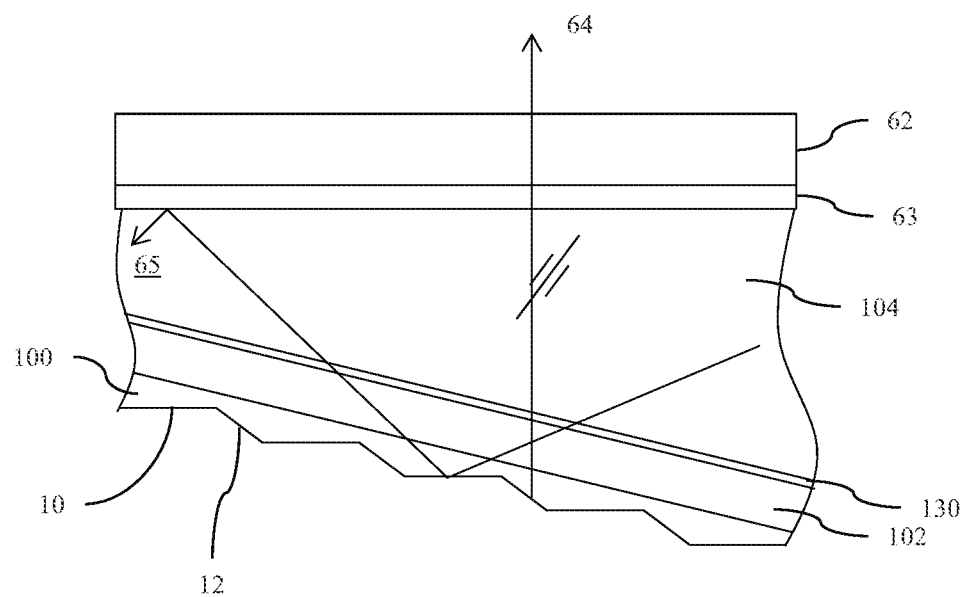
FIG. 27 is a schematic diagram illustrating a side view of a structured optical film for use in a stepped waveguide further comprising a field Fresnel lens element, in accordance with the present disclosure.

FIG. 27 is a schematic diagram illustrating a side view of a structured optical film 100 for use in a stepped waveguide further including a field Fresnel lens element. Further, FIG. 27 is a schematic diagram illustrating a side view of part of a stepped waveguide valve apparatus including a transmissive Fresnel element 62 arranged on a first side of body 104 and structured optical film 100 on a second side of body 104. Layer 130 may include a material with refractive index arranged to provide index matching between the body 104 and substrate 102. An air gap may be arranged between the element 62 and body 104. However, it may be desirable to obtain a uniform air gap which may be difficult if the material of the element 62 is thin and may create non-uniform output illumination. Fresnel element 62 may alternatively be arranged with a layer 63 of refractive index lower than the refractive index of body 104. For example, the layer 63 may be, but is not limited to, a silicone, a fluorinated material, an aerogel, and so forth. A silicone with an approximate refractive index 1.4 may be arranged with a body of approximate refractive index 1.5 such that the critical angle within the body 1.4 is approximately 69 degrees. Thus light rays 65 propagating within the body 104 may be reflected from layer 63 whereas light rays 64 that are at angles less than the critical angle may be outputted through the Fresnel element 62.

FIG. 28 is a schematic diagram illustrating a front view of a structured optical film for use in a stepped waveguide, FIG. 29 is a schematic diagram illustrating a side view of an assembly method for a stepped waveguide, and FIG. 30 is a schematic diagram illustrating a side view of an assembly method for a stepped waveguide. Further, FIG. 28 is a schematic diagram illustrating a composite structured optical film which may be a structured optical film 100, reflective Fresnel element 140 and transmissive Fresnel element 62, separated by boundaries 120. FIG. 29 is a schematic diagram illustrating a side view of, folding of a composite structured optical film which may be a structured optical film 100, reflective Fresnel element 140 and transmissive Fresnel element 62, separated by boundaries 120. FIG. 30 is a schematic diagram illustrating approximate alignment of a structured optical film which may be a structured optical film 100, reflective Fresnel element 140 and transmissive Fresnel element 62, separated by boundaries 120 with body 104. Prior to assembly, adhesive layers 130, 63 which may be patterned may be formed in approximate alignment with respective film 100 and element 62 on the rear of substrate 102. Advantageously, the element may be approximately aligned with a single alignment step for all three sides of the body 104.

Figure 31:
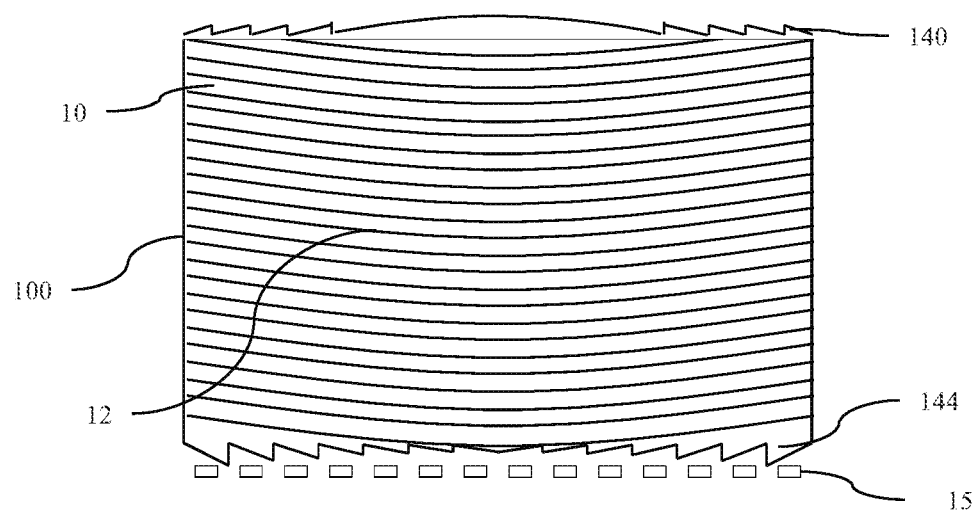
FIG. 31 is a schematic diagram illustrating a stepped imaging directional backlight, in accordance with the present disclosure.

FIG. 31 is a schematic diagram illustrating a stepped imaging directional backlight. Further, FIG. 31 is a schematic diagram illustrating a stepped waveguide including a structured optical film 100 which may include curved features 10, 12, a reflective Fresnel element 140 and an input optical element 144 which may be arranged to direct light from an array of light sources in air, into the valve with a common illumination direction, thus increasing efficiency and viewing angle in an autostereoscopic display. The input optical element 144 may further comprise colored filters, optical diffusers or other cross talk reduction layers as generally discussed in U.S. patent application Ser. No. 13/836,443 (entitled "Cross talk suppression apparatus and method thereof"), which is herein incorporated by reference in its entirety.

Figure 32:
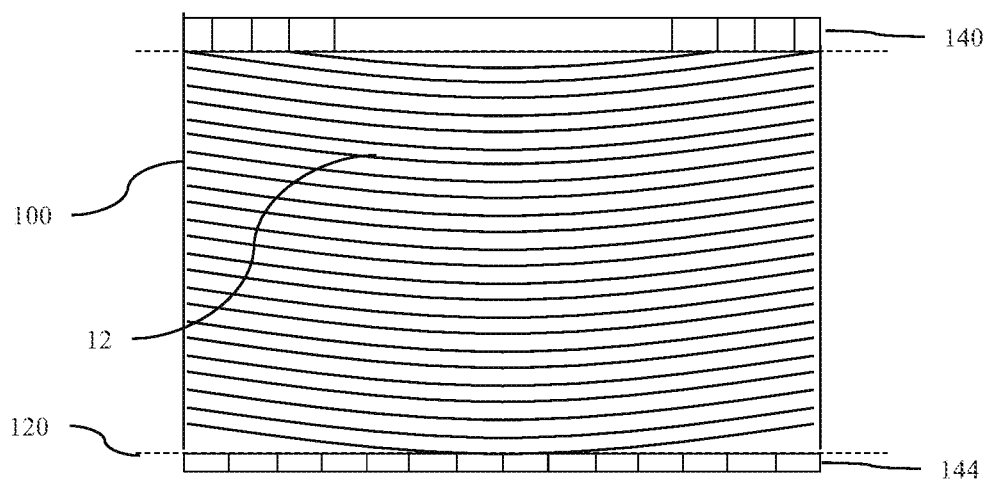
FIG. 32 is a schematic diagram illustrating a front view of a structured optical film for use in a stepped waveguide, in accordance with the present disclosure.
Figure 33:
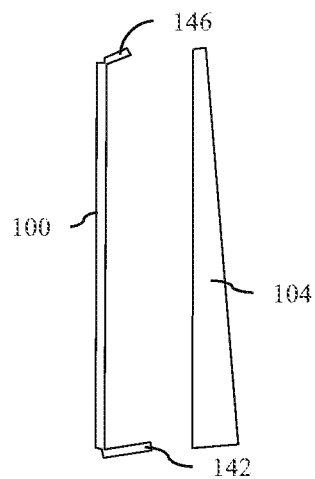
FIG. 33 is a schematic diagram illustrating a side view of an assembly method for a stepped waveguide, in accordance with the present disclosure.
Figure 34:
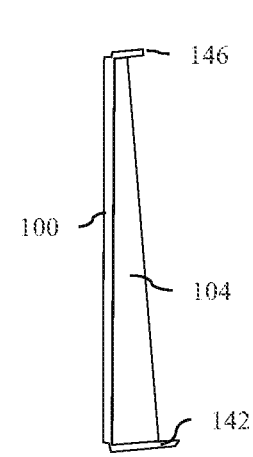
FIG. 34 is a schematic diagram illustrating a side view of an assembly method for a stepped waveguide, in accordance with the present disclosure.
Figure 35:
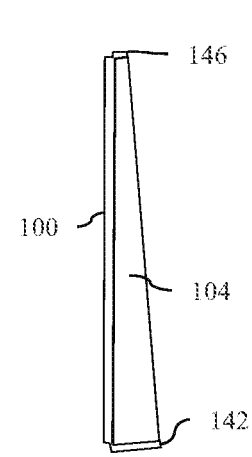
FIG. 35 is a schematic diagram illustrating a side view of an assembly method for a stepped waveguide, in accordance with the present disclosure.

FIG. 32 is a schematic diagram illustrating a front view of a structured optical film for use in a stepped waveguide. Further, FIG. 32 is a schematic diagram illustrating a composite structured optical film including a structured optical film 100, reflective Fresnel element 140 and input optical element 144, separated by boundaries 120. FIG. 33 is a schematic diagram illustrating a side view of an assembly method for a stepped waveguide, FIG. 34 is a schematic diagram illustrating a side view of an assembly method for a stepped waveguide, and FIG. 35 is a schematic diagram illustrating a side view of an assembly method for a stepped waveguide. Further, FIGS. 33, 34 and 35 are schematic diagram illustrating a side view of the respective folding, assembly and trimming of the substrate 102 with optical body 104. Thus, the alignment of the optical structures can be achieved in a single alignment step, reducing cost and complexity. Advantageously the optical film 100 may be slightly undersized so that trimming may not be needed.

Figure 36:
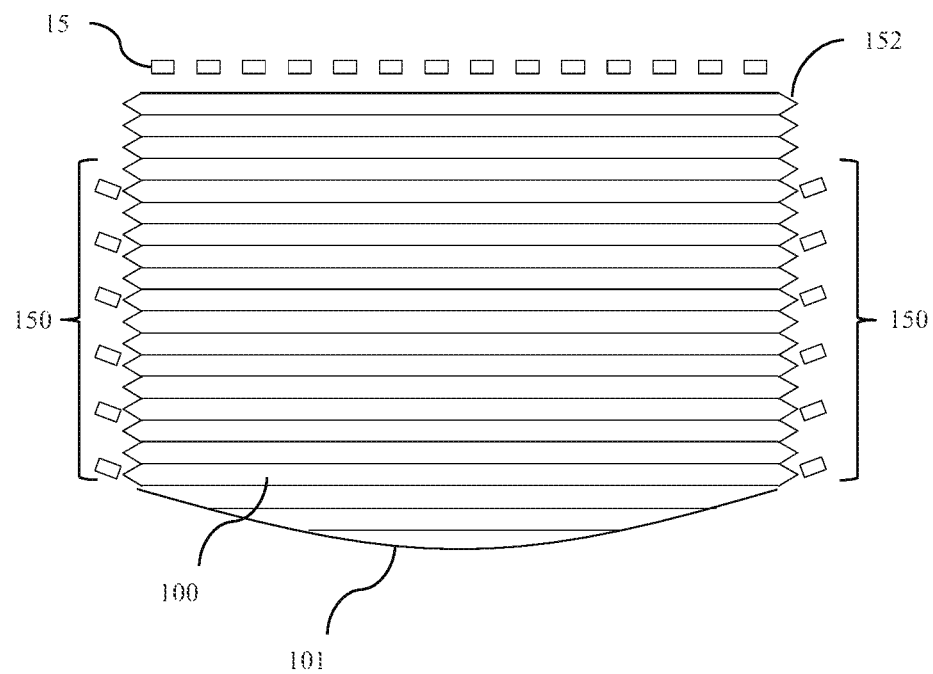
FIG. 36 is a schematic diagram illustrating a stepped imaging directional backlight, in accordance with the present disclosure.

FIG. 36 is a schematic diagram illustrating a stepped imaging directional backlight. Further, FIG. 36 is a schematic diagram illustrating a stepped waveguide including a structured optical film 100 which may include features 10, 12, and a structured edge input optical element 152 which may be arranged to direct light from an array of light sources 150 into the side of the valve, providing a switchable wide viewing angle for an autostereoscopic display, as generally described in U.S. patent application Ser. No. 13/839,552 (entitled "Wide angle imaging directional backlights"), and herein incorporated by reference, in its entirety.

Figure 37:
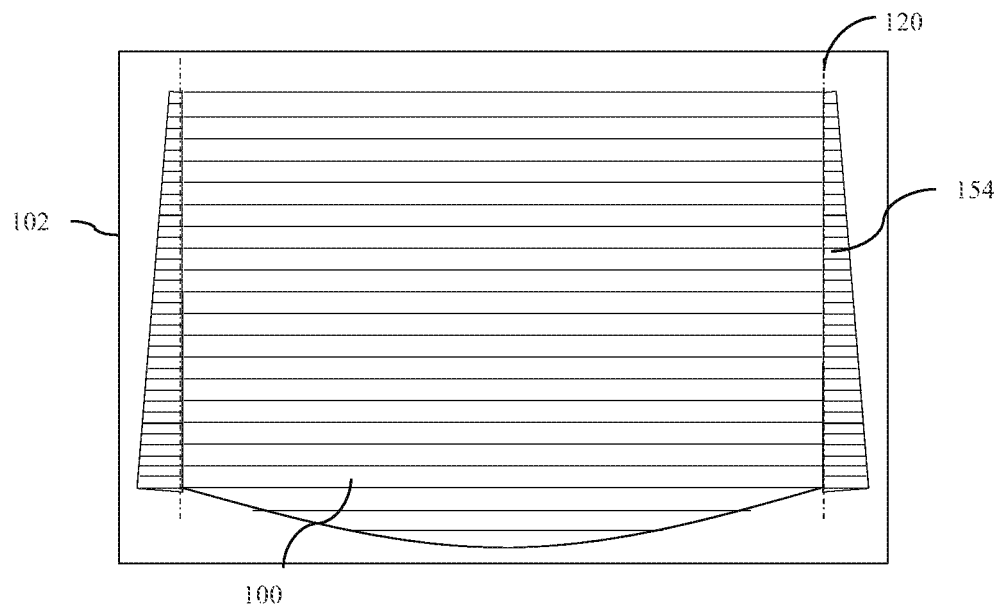
FIG. 37 is a schematic diagram illustrating a front view of a structured optical film for use in a stepped waveguide, in accordance with the present disclosure.

FIG. 37 is a schematic diagram illustrating a front view of a structured optical film for use in a stepped waveguide. Further, FIG. 37 is a schematic diagram illustrating a structured optical film 100, and input optical elements 154, separated by boundaries 120. Such an arrangement can advantageously be provided in approximate alignment with body 104 in a single alignment step. The external parts of substrate 102 may be removed by cutting for example prior to or after assembly with the body 104.

Figures 38, 39:
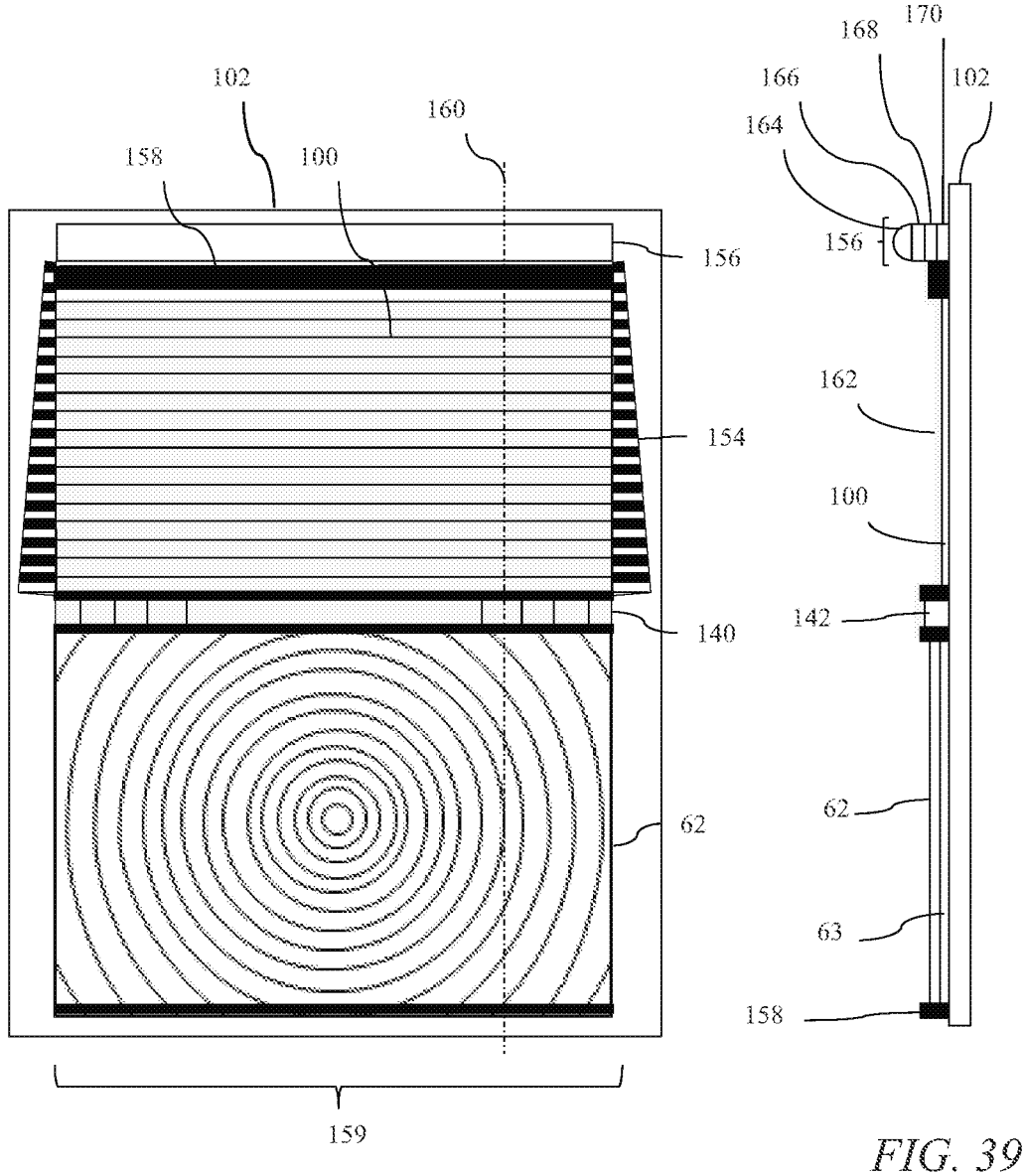
FIG. 38 is a schematic diagram illustrating a front view of a structured optical film for use in a stepped waveguide, in accordance with the present disclosure.
FIG. 39 is a schematic diagram illustrating a side view of a structured optical film for use in a stepped waveguide, in accordance with the present disclosure.
Figure 40A:
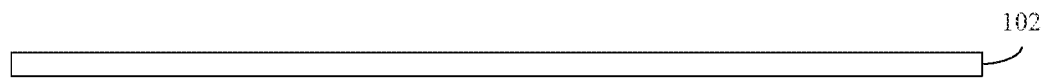
FIGS. 40A-G are schematic diagrams illustrating a fabrication method for a structured optical film for use in a stepped waveguide, in accordance with the present disclosure.
Figure 40B:
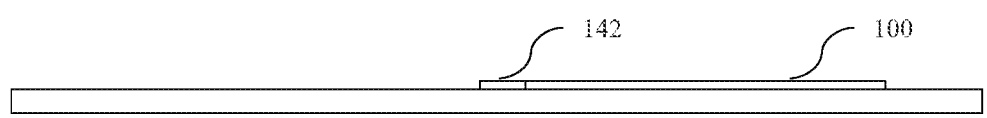
Figure 40C:
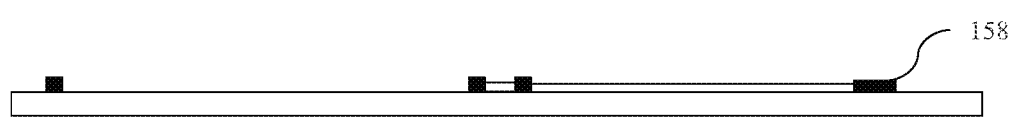
Figure 40D:
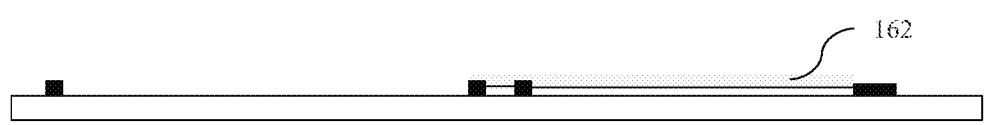
Figure 40E:
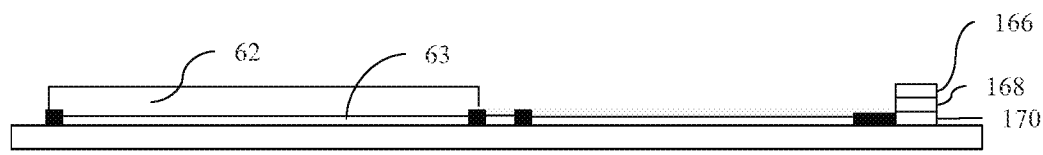
Figure 40F:
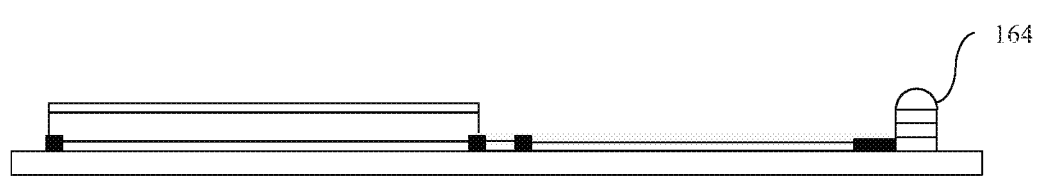
Figure 40G:
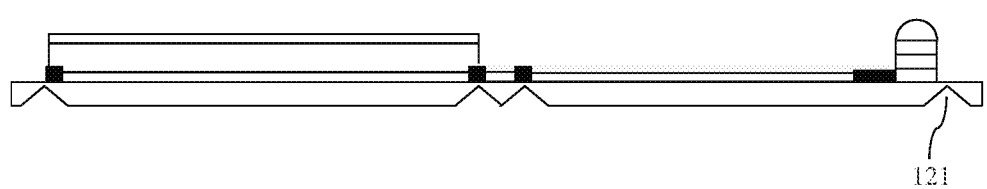

FIG. 38 is a schematic diagram illustrating a front view of a structured optical film for use in a stepped waveguide. Further, FIG. 38 is a schematic diagram illustrating a composite structured optical film 159 including a structured optical film 100, and input optical elements 154, reflective Fresnel element 140, transmissive Fresnel element 62, and input optical element 156. Further, absorbing regions 158 may be arranged in approximate alignment with features of the various optical structures including at boundaries between the film and optical elements. Such absorbing regions may reduce scatter in the device. Further regions in alignment with film 100 and element 62 may be metallized to provide a reflective function. Such absorbing regions 158 may be provided by printing of dye or pigment materials. Further the reflector formed on the sides of the waveguide 1 may comprise a reflector film such as metallized aluminum or Enhanced Specular Reflector ESR™ from 3M corporation.

FIG. 39 is a schematic diagram illustrating a side view of a structured optical film for use in a stepped waveguide. Further, FIG. 39 is a schematic diagram illustrating a side view along section 160 of a structure optical film 100. Optical element 156 may, for example, include a structure optical element such as element 144 or may include a stack of films and other optical element that are attached to the element. For example layers 166, 168 that may comprise color filters or diffusers may be attached by adhesive 170 to compensate for cross talk for reflected light from side 2 of the stepped waveguide. Further a lens element 164 such as a cylindrical lens may be arranged on the optical element 156, for example to achieve a two dimensional array of viewing windows as generally described in U.S. Patent Application No. 61/648,873 (entitled "Imaging directional backlight with two dimensional window arrays"), filed concurrently herewith, and herein incorporated by reference, in its entirety.

FIGS. 40A-G are schematic diagrams illustrating a fabrication method for a structured optical film for use in a stepped waveguide. Further, FIGS. 40A-G are schematic diagrams illustrating a side view of a method to form a composite structured element similar to that shown in FIGS. 38 and 39. In a first step a substrate 102 may be processed to modify its surface energy properties, for example, the substrate may be a PET or COC film that is ozone plasma treated. In a second step optical structures including structured optical film 100 and reflective Fresnel structure 140 may be formed on the surface, for example, by means of UV casting. In a third step, absorbing regions 158 may be applied to the substrate, for example by printing a black ink in appropriate positions. In a fifth step the film 100 and structure 140 may have a reflective layer 162 applied, for example, by Aluminium or Silver in a vacuum coating chamber. Alternatively the absorbing or the reflecting layers may be formed separately and attached by adhesive. Further protective layers may be applied to the top surface of the metal to increase its reflectivity and ruggedness. In a sixth step, further optical elements including transmissive Fresnel element 62 and optical layers 166, 168 may be attached and a cylindrical lens 164 may be attached to the optical films. Finally, in the boundary regions, the substrate 102 may be partially cut to provide regions that may be bent during the approximate alignment to the body 104. Advantageously, such approximate alignments can be achieved for many elements in parallel and over large area, providing a low cost and high volume manufacturing process.

Figure 41:
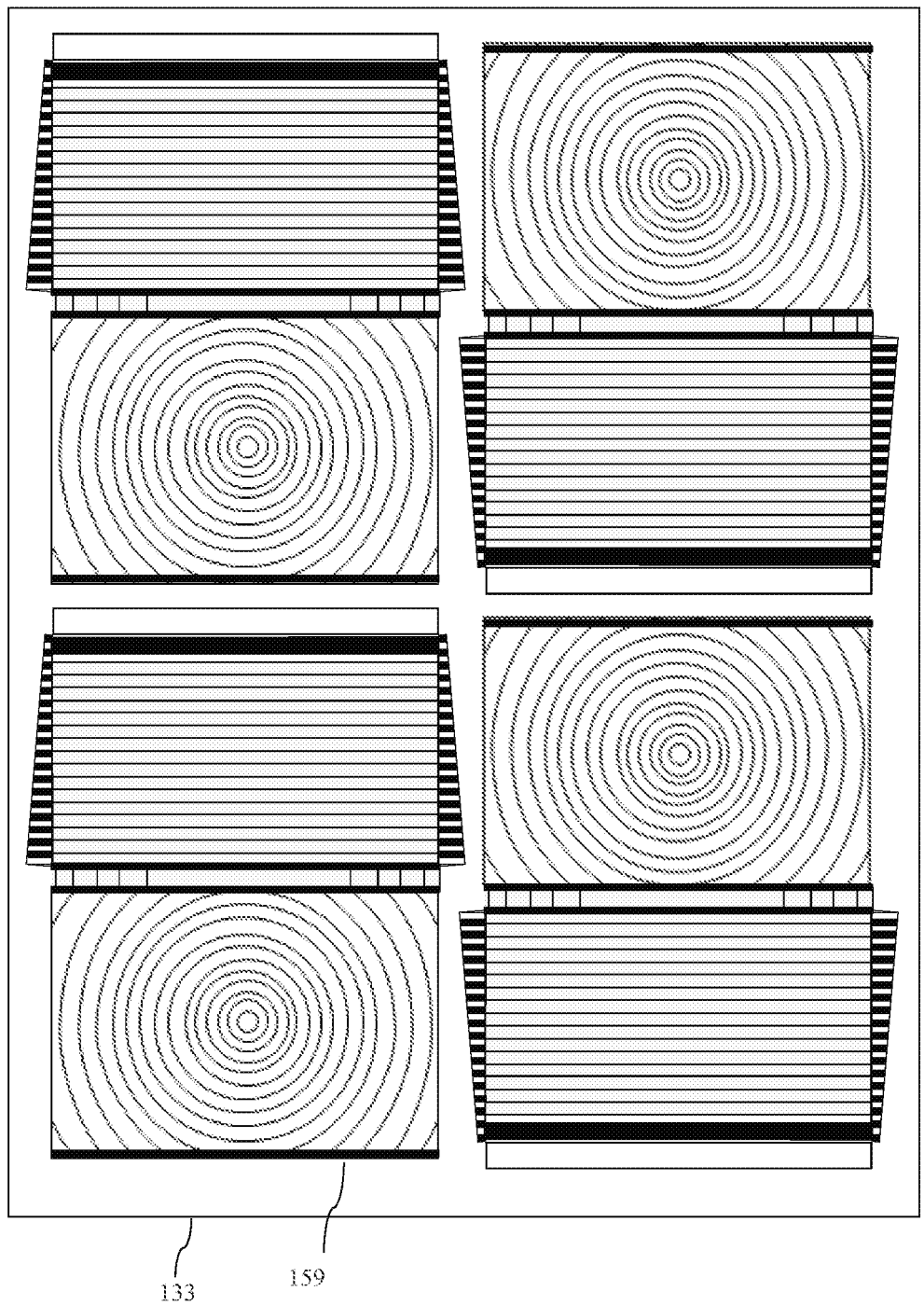
FIG. 41 is a schematic diagram illustrating an array of structured elements of a structured optical film for use in a stepped waveguide, in accordance with the present disclosure.

FIG. 41 is a schematic diagram illustrating an array of structured elements of a structured optical film for use in a stepped waveguide. Further, FIG. 41 is a schematic diagram illustrating a composite substrate 133 comprising multiple composite structured optical films 159 that may be formed in parallel so that many elements can be processed in a web format prior to cutting and alignment with body 104, advantageously reducing cost.

Figure 42A:
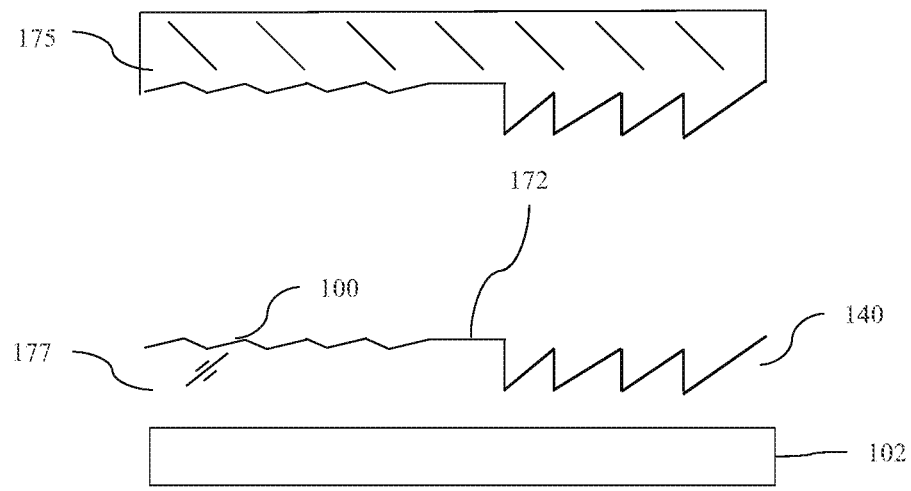
FIG. 42A is a schematic diagram illustrating a side view of a structured optical film structure and tool for use in a stepped waveguide, in accordance with the present disclosure.

FIG. 42A is a schematic diagram illustrating a side view of a structured optical film structure and tool for use in a stepped waveguide. Further, FIG. 42A is a schematic diagram illustrating a side view of a composite substrate and tool used to form the substrate. A single tool 175 may be used be used to replicate into a single layer 177 such that film 100 and structure 140 may be separated by mesa 172.

Figure 42B:
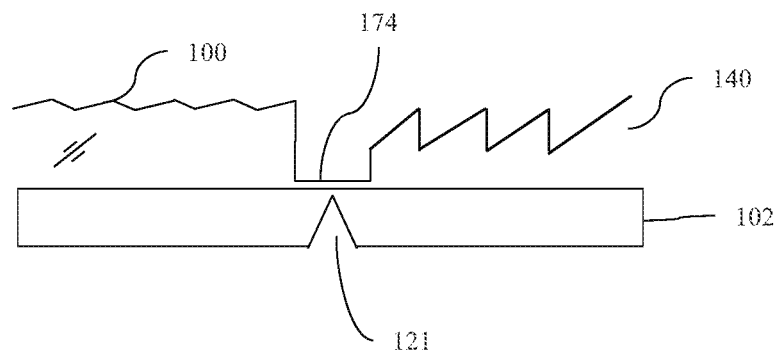
FIG. 42B is a schematic diagram illustrating a side view of a structured optical film structure for use in a stepped waveguide, in accordance with the present disclosure.

FIG. 42B is a schematic diagram illustrating a side view of a structured optical film structure for use in a stepped waveguide. Further, FIG. 42B is a schematic diagram illustrating a side view of a composite substrate that may also be formed by a single tool. In this case, a mesa 174 may be arranged to have much lower depth to reduced stress during bending of the substrate 102.

Figure 43:
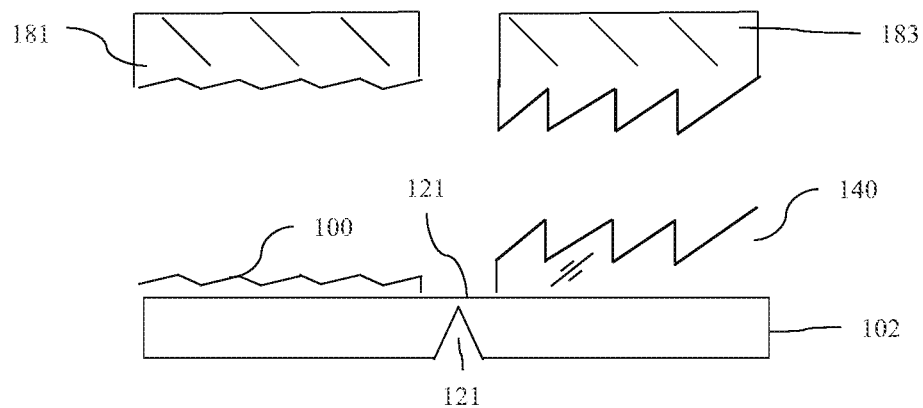
FIG. 43 is a schematic diagram illustrating a side view of a structured optical film structure for use in a stepped waveguide, in accordance with the present disclosure.

FIG. 43 is a schematic diagram illustrating a side view of a structured optical film structure for use in a stepped waveguide. Further, FIG. 43 is a schematic diagram illustrating a side view of a composite substrate and tool which may be used to form the substrate. Two separate tools 181, 183 may be used in two separate replication steps to form layers for film 100 and element 140 that may have different thicknesses. Advantageously the amount of material that may be used can be reduced and the base thickness of the replication material can be adapted to suit the depth of the structure. Further a gap can be provided in the boundary region 120 to reduce stress during bending of substrate 102.

Figure 44:
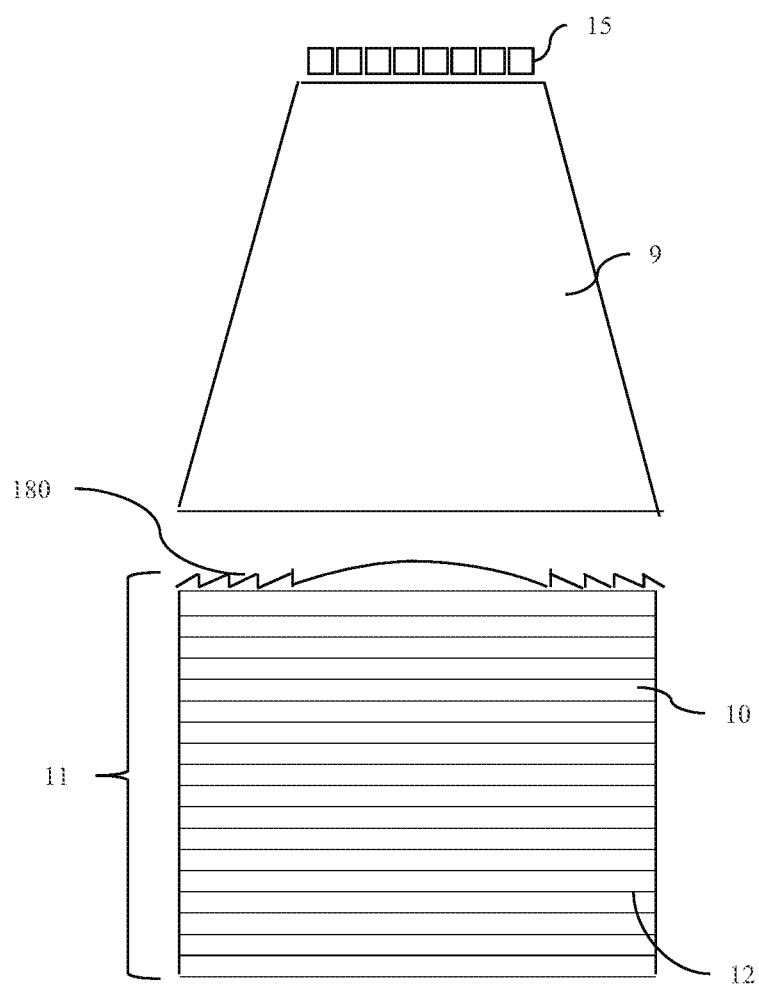
FIG. 44 is a schematic diagram illustrating an optical inline directional backlight stepped waveguide optical element, in accordance with the present disclosure.

FIG. 44 is a schematic diagram illustrating an optical inline directional backlight stepped waveguide optical element. Further, FIG. 44 is a schematic diagram illustrating a stepped waveguide optical inline backlight as generally described in U.S. Patent Application No. 61/649,124 (entitled "Optical inline directional backlight apparatus and method thereof, filed concurrently herewith, and herein incorporated by reference, in its entirety.

Beam expanding region 9 may include a substantially planar parallel waveguide while light extraction region 11 may include light guiding features 10 and light extracting features 12 with similar function to the stepped waveguide described herein. A transmissive Fresnel element 180 may be arranged at the input to the light extracting region. The light extracting region may be formed in a similar manner to that shown in FIGS. 24 and 25 within advantages described herein.

Figure 45:
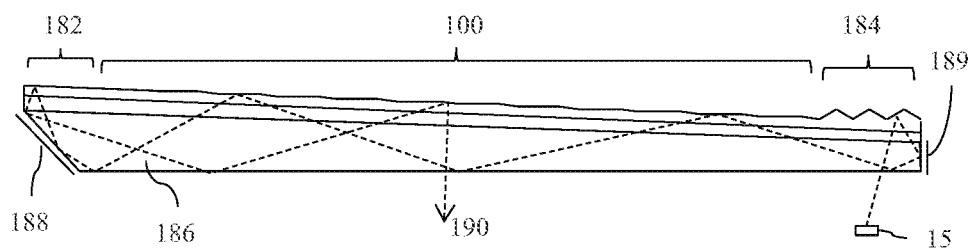
FIG. 45 is a schematic diagram illustrating a side view of a stepped imaging directional backlight comprising a structured optical film, in accordance with the present disclosure.

FIG. 45 is a schematic diagram illustrating a stepped imaging directional backlight including a structured optical film that remains planar during operation. Further, FIG. 45 is a schematic diagram illustrating a stepped waveguide in which the structured components may be arranged on one side of a tapered body 186. The structured body may have a metallized and inclined side 188 and metallized side 189. Light rays 190 from light emitting element array 15 may be substantially coupled into the waveguide by means of prismatic structure 184 and reflective side 189. After reflection at side 188 and redirection by reflective Fresnel element 182 the light may be output by light extraction features 12.

Figure 46:
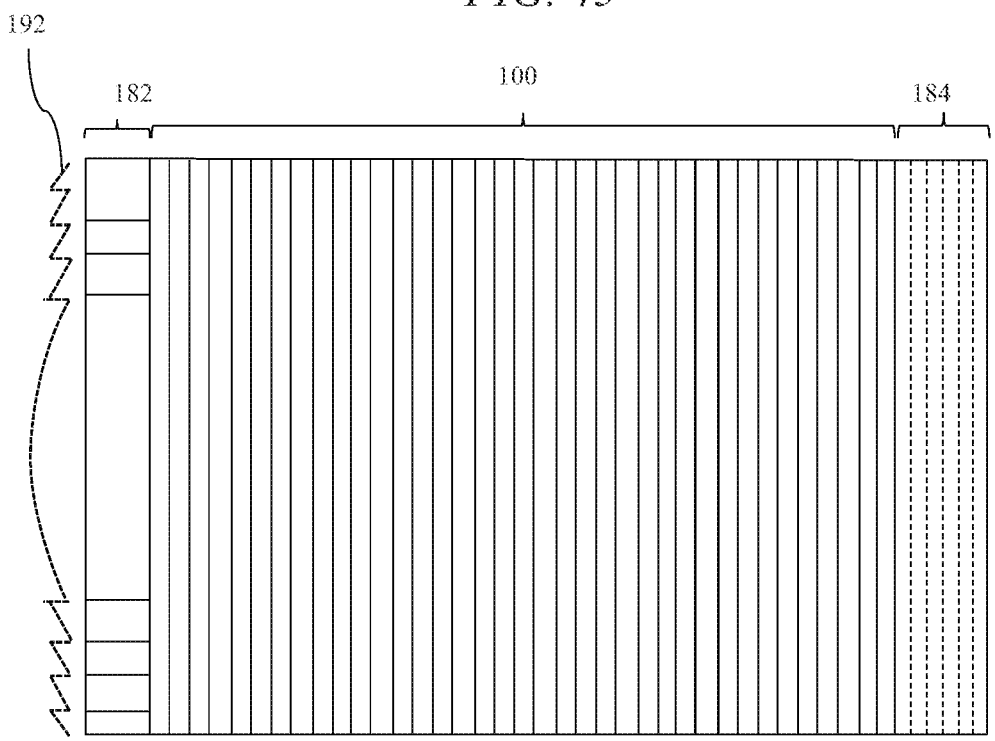
FIG. 46 is a schematic diagram illustrating a front view of a structured optical film for use in a stepped waveguide, in accordance with the present disclosure.

FIG. 46 is a schematic diagram illustrating a front view of a structured optical film for use in a stepped waveguide. Further, FIG. 46 is a schematic diagram illustrating an unfolded composite optical structure which may be formed on one side of the body 186 with film 100, light input structure 184 and reflective Fresnel element 182, with profile 192 shown as a side view for comparison. Structures 182 may be metallized and film 100 may also be metallized.

Figure 47:
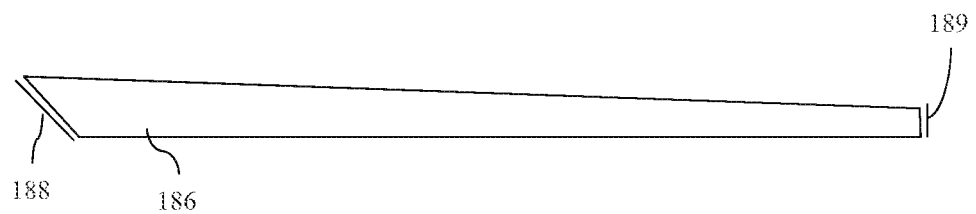
FIG. 47 is a schematic diagram illustrating a side view of an optical body element, arranged for approximate alignment with a structured optical film, in accordance with the present disclosure.

FIG. 47 is a schematic diagram illustrating a side view of an optical body element, arranged for approximate alignment with a structured optical film. Further, FIG. 47 is a schematic diagram illustrating the optical body 186 for approximate alignment with the unfolded composite structure of FIG. 46.

Advantageously the embodiments of FIGS. 45 to 47 may achieve a single layer optical structure that may combine multiple optical functions and can be formed on a single substrate.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A stepped waveguide comprising:
a tapered optical body comprising substantially planar sides that are tapered with respect to each other, and further sides extending between the planar sides;
a substrate disposed on the tapered optical body, the substrate comprising a polymer film; and
a structured optical film arranged with the tapered optical body, the structured optical film formed on the substrate, the structured optical film comprising a light extraction region and an edge region, wherein the light extraction region comprises a plurality of guiding features and a plurality of extraction features, wherein the extraction features and the guiding features are connected to and alternate with one another respectively, and the edge region of the structured optical film comprises a reflective Fresnel element,
the light extraction region of the structured optical film being attached to one of the planar sides of the optical body, the structured optical film being folded such that the edge region of the structured optical film is attached to one of the further sides of the optical body.

2. A stepped imaging directional waveguide according to claim 1, wherein
the further sides include sides at the ends of the waveguide in a direction in which the substantially planar sides are tapered, being a thick further side and a thin further side, and
the edge region of the structured optical film is attached to the thick further side.

3. A stepped waveguide according to claim 2, wherein the structured optical film further comprises a further edge region, the further edge region of the structured optical film comprising an input optical element the further edge region of the structured optical film being folded and attached to the thin further side.

4. A stepped waveguide according to claim 3, wherein the input optical element comprises an optical diffuser.

5. An illumination apparatus comprising:
a stepped waveguide according to claim 4; and
an array of light sources disposed at different input positions across the thin further side and arranged to input light into the waveguide through the thin further side.

6. A stepped waveguide according to claim 3, wherein the input optical element comprises a colored filter, a cross-talk reduction layer, or an array of input facets.

7. An illumination apparatus comprising:
a stepped waveguide according to claim 6; and
an array of light sources disposed at different input positions across the thin further side and arranged to input light into the waveguide through the thin further side.

8. An illumination apparatus comprising:
a stepped waveguide according to claim 3; and
an array of light sources disposed at different input positions across the thin further side and arranged to input light into the waveguide through the thin further side.

9. An illumination apparatus comprising:
a stepped waveguide according to claim 2; and
an array of light sources disposed at different input positions across the thin further side and arranged to input light into the waveguide through the thin further side.

10. A stepped waveguide according to claim 1, wherein the structured optical film comprises plural edge regions, each edge region comprising a further optical element, the plural edge regions of the structured optical film being folded and attached to different ones of the further sides.

11. A stepped waveguide according to claim 10, wherein the further sides include two lateral sides arranged laterally of a direction in which the substantially planar sides are tapered, and
the plural edge regions of the structured optical film include two edge regions attached to the two lateral sides, and
the further optical element comprises a metallized portion.

12. A stepped waveguide according to claim 1, wherein the extraction features are elongate and curved along their length.

13. A stepped waveguide according to claim 1, wherein the further optical element has a surface relief portion.

14. A stepped waveguide according to claim 1, wherein the tapered optical body is made of plastic or glass.

15. A stepped waveguide according to claim 1, wherein the structured optical film is attached to the optical body by a bonding layer disposed between the substrate and the optical body.

16. A stepped waveguide according to claim 15, wherein the bonding layer provides an index matching interface between the structured optical film and the optical body.

* * * * *